(12) United States Patent
Sasaki et al.

(10) Patent No.: US 8,988,823 B1
(45) Date of Patent: Mar. 24, 2015

(54) THIN-FILM MAGNETIC HEAD, METHOD OF MANUFACTURING THE SAME, HEAD GIMBAL ASSEMBLY, AND HARD DISK DRIVE

(71) Applicants: Yoshitaka Sasaki, Milpitas, CA (US); Hiroyuki Ito, Milpitas, CA (US); Shigeki Tanemura, Milpitas, CA (US); Kazuki Sato, Milpitas, CA (US); Seiichiro Tomita, Milpitas, CA (US); Tatsuya Shimizu, Hong Kong (CN)

(72) Inventors: Yoshitaka Sasaki, Milpitas, CA (US); Hiroyuki Ito, Milpitas, CA (US); Shigeki Tanemura, Milpitas, CA (US); Kazuki Sato, Milpitas, CA (US); Seiichiro Tomita, Milpitas, CA (US); Tatsuya Shimizu, Hong Kong (CN)

(73) Assignees: Headway Technologies, Inc., Milpitas, CA (US); Sae Magnetics (H.K.) Ltd., Hong Kong (CN)

( * ) Notice: Subject to any disclaimer, the term of this patent is extended or adjusted under 35 U.S.C. 154(b) by 15 days.

(21) Appl. No.: 14/046,187

(22) Filed: Oct. 4, 2013

(51) Int. Cl.
  *G11B 5/127* (2006.01)
  *G11B 5/11* (2006.01)
  *G11B 5/31* (2006.01)

(52) U.S. Cl.
  CPC ... *G11B 5/11* (2013.01); *G11B 5/31* (2013.01)
  USPC ...................................................... 360/125.3

(58) Field of Classification Search
  USPC ............... 360/125.3, 125.03, 125.09, 125.12, 360/125.16, 125.17, 125.06, 125.26
  See application file for complete search history.

(56) References Cited

U.S. PATENT DOCUMENTS

| | | | | |
|---|---|---|---|---|
| 8,390,955 B1 * | 3/2013 | Sasaki et al. | ................ | 360/125.3 |
| 8,514,520 B2 * | 8/2013 | Sasaki et al. | ................ | 360/125.3 |
| 8,576,514 B2 * | 11/2013 | Sasaki et al. | ................ | 360/125.3 |
| 8,837,083 B1 * | 9/2014 | Sasaki et al. | ............. | 360/125.03 |
| 2013/0057987 A1 * | 3/2013 | Sasaki et al. | ................ | 360/245.3 |

FOREIGN PATENT DOCUMENTS

| | | |
|---|---|---|
| JP | A-2007-272958 | 10/2007 |
| JP | A-2009-295262 | 12/2009 |
| JP | A-2010-157303 | 7/2010 |
| JP | A-2010-176732 | 8/2010 |

* cited by examiner

*Primary Examiner* — Allen T Cao
(74) *Attorney, Agent, or Firm* — Oliff PLC

(57) ABSTRACT

A thin-film magnetic head is constructed such that a main magnetic pole layer, a write shield layer, a gap layer, and a thin-film coil are laminated on a substrate. The thin-film magnetic head has a leading shield part opposing the main magnetic pole layer on the substrate side of the main magnetic pole layer, a substrate side shield part comes in contact with the leading shield part. The thin-film coil has a substrate side coil layer disposed between the main magnetic pole layer and the substrate. In the thin-film magnetic head, the spaces to the substrate about a leading lower end face of the leading shield part, a shield upper end face of the substrate side shield part, and coil upper end face of the substrate side coil layer are formed to be equal to each other. Further, a depth of the leading shield part is formed to be small than the depth of the substrate side shield part.

18 Claims, 31 Drawing Sheets

(a)        (b)

(a)

(b)

THIN-FILM MAGNETIC HEAD, METHOD OF MANUFACTURING THE SAME, HEAD GIMBAL ASSEMBLY, AND HARD DISK DRIVE

BACKGROUND

1. Field of the Invention

The present invention relates to a thin-film magnetic head which performs a magnetic recording action by a perpendicular magnetic recording scheme, a method of manufacturing the same, a head gimbal assembly, and a hard disk drive.

2. Related Background Art

A hard disk drive has a large recording capacity and is used as the heart of a storage device. The hard disk drive records and reproduces data to/from a hard disk (recording medium) by a thin-film magnetic head.

The thin-film magnetic heads can roughly be classified according to their recording schemes into those of longitudinal magnetic recording type and those of perpendicular magnetic recording type. The longitudinal magnetic recording scheme records data in a (longitudinal) direction within a recording surface of a hard disk (recording medium), while the perpendicular magnetic recording scheme records data such that the direction of recording magnetization formed in the hard disk is made perpendicular to the recording surface. The thin-film magnetic heads of perpendicular magnetic recording type have been considered more promising than those of longitudinal magnetic recording type, since they can realize a much higher recording density than that in the longitudinal magnetic recording scheme, while their recorded hard disks are less susceptible to heat fluctuation.

Meanwhile, a conventional magnetic head of perpendicular magnetic recording type (perpendicular magnetic recording head which will also be referred to as "PMR" in the following) has a magnetic pole layer and a thin-film coil. The PMR has a structure of electromagnet which the thin-film coil are wound around the magnetic pole layer.

As the conventional PMR, PMRs each including a shield layer on a trailing side of a main magnetic pole layer are disclosed, for example, in JP 2007-272958 (referred to also as Patent Document 1), JP 2010-176732 (referred to also as Patent Document 2), JP 2010-157303 (referred to also as Patent Document 3), JP 2009-295262 (referred to also as Patent Document 4) and so on.

SUMMARY OF THE INVENTION

A conventional PMR, which has shield layers formed not only the trailing side of the main magnetic pole layer but also the leading side of the main magnetic pole layer is disclosed for example, in JP 2010-157303 and so on. Since this kind of PMR has shield layers formed both trailing side and leading side, it also called as PMR of DWS (Double Write Shield) structure. A PMR 800 illustrated in FIG. 31 is one example of PMRs including such the DWS structure.

The PMR 800 has an upper thin-film coil 708 and a main magnetic pole layer 710. Further, the PMR 800 has an upper shield layer 705 formed trailing side of the main magnetic pole layer 710, and it has a lower thin-film coil 718 and a lower shield layer 730 formed leading side of the main magnetic pole layer 710. Furthermore, the PMR 800 has a reproducing head 719 and insulating layers 731, 732.

The upper shield layer 705 has a shield part 701 opposing the main magnetic pole layer 710, a front shield part 703 disposed at a medium-opposing surface 706 side of the upper thin-film coil 708, a connecting shield part 702 connects the shield part 701 with the front shield part 703, and a linking shield part 704 straddling the upper thin-film coil 708. In the PMR 800, a coil-insulating layer 709 is disposed between adjacent parts of the upper thin-film coils 708.

Further, the lower shield layer 730 has a leading shield part 711, a front shield part 712, a connecting shield part 713 and a linking shield part 714. Since both the leading shield part 711 and connecting shield part 713 have end faces disposed at the ABS 706, they are exposed in the ABS 706.

Incidentally, the front shield part 712 is disposed on the ABS 706 side of the lower thin-film coil 718, but the front shield part 712 recedes from the ABS 706, and an opposing insulating layer 733 is disposed on the ABS 706 side of the front shield part 712 in the PMR 800.

If the front shield part 712 is exposed in the ABS 706, the ABS 706 may project when a coil insulating layer 721 expands due to heat generation of the thin-film coil 718 caused by the current flowing through the thin-film coil 718.

However, since the front shield part 712 recedes from the ABS 706 in the PMR 800, the ABS 706 is less likely to project due to the heat generation caused by the current flowing through the thin-film coil 718. Therefore, it is possible to decrease the flying height to increase the recording density in the PMR 800.

In addition, the size of the magnetic material exposed in the ABS 706 is small as compared with the case where the front shield part 712 is exposed in the ABS 706. This decreases the magnetic flux leaking from the main magnetic pole layer 710 to the ABS 706 passing through the leading shield part 711.

When the magnetic flux leaking to the ABS 706 through the leading shield part 711 increase, a phenomenon, that data recorded on a track adjacent to a track on which data is to be recorded or a track located at a position distanced by about several μm to several tens μm from a track on which data is to be recorded is erased (these phenomena are referred also to as Adjacent Track Erasure (ATE) and Wide Area Track Erasure (WATE), is easy to cause.

However, since the front shield part 712 recedes from the ABS 706 in the PMR 800, ATE, WATE are improved as compared with the case where the front shield part 712 is exposed in the ABS 706.

Incidentally, the front shield part 712 receding from the ABS 706 needs to be connected to the leading shield part 711 exposed in the ABS 706 in the PMR 800, and therefore the connecting shield part 713 needs to be formed separately from the front shield part 712.

For this reason, a step for forming the connecting shield part 713 needs to be necessarily performed, in case of manufacturing the PMR 800. Since the connecting shield part 713 is formed by performing polishing by chemical mechanical polishing (hereinafter, referred to as "CMP") together with the insulating layer 732, a step of manufacturing a magnetic layer for forming the connecting shield part 713 and a step of forming an insulating layer for forming the insulating layer 732 are indispensable, for forming the connecting shield part 713. Accordingly, simplification of the manufacturing steps has been difficult in the PMR 800, and increase in the number of PMRs 800 which can be manufactured in a unit time has also been difficult.

On the other hand, there is restriction that the read/write separation (referred also to as "RWS") that is the spacing in the direction along the ABS between the main magnetic pole layer and the reproducing head is made to keep within a certain dimension range (for example, 4.5 μm to 5 μm), in relation to the conventional PMR.

However, the connecting shield part 713 is disposed between the main magnetic pole layer 710 and the reproducing head 719 in the PMR 800, so that the RWS is increased in length corresponding to the length of the connecting shield part 713. Therefore, it has been very difficult in the PMR 800 to comply with the restriction that the RWS is kept within a certain dimension range.

As described above, it has been extremely difficult in the conventional PMR to reduce ATE, WATE while complying with the restriction of the RWS and to simplify the manufacturing steps so as to increase the number of PMRs manufactured in a unit time.

The present invention is made to solve the above problem, and it is an object to reduce ATE, WATE while complying with the restriction of RWS and to simplify the manufacturing steps so as to increase the number of thin-film magnetic heads manufactured in a unit time in a thin-film magnetic head performing magnetic recording operation in the vertical magnetic recording system and a method of manufacturing the same and a head gimbal assembly and a hard disk drive.

To solve the above problem, the present invention is a thin-film magnetic head constructed such that a main magnetic pole layer having a magnetic pole end face on a side of a medium-opposing surface opposing a recording medium, a write shield layer having a write shield end face disposed in the medium-opposing surface, a gap layer formed between the main magnetic pole layer and write shield layer, and a thin-film coil wound around any of the main magnetic pole layer, the write shield layer or a shield magnetic layer connected the main magnetic pole layer are laminated on a substrate, the thin-film coil includes a substrate side coil layer disposed between the main magnetic pole layer and the substrate, the shield magnetic layer including: a leading shield part having a leading front end face disposed in the medium-opposing surface, and opposing the main magnetic pole layer through a nonmagnetic thin-film on the substrate side of the main magnetic pole layer; and a substrate side shield part having a shield upper end face in direct contact with a leading lower end face disposed at a position closest to the substrate in the leading shield part, and a shield front end face disposed in the medium-opposing surface, spaces to the substrate about the leading lower end face of the leading shield part, the shield upper end face of the substrate side shield part, and a coil upper end face disposed at a position most distanced from the substrate in the substrate side coil layer are formed to be equal to each other, the leading shield part has a tilted rear end face tilted to come closer to the medium-opposing surface toward the main magnetic pole layer, and a depth of the leading shield part along an intersecting direction intersecting the medium-opposing surface like perpendicular is formed to be smaller than a depth of the substrate side shield part along the intersecting direction.

In the thin-film magnetic head, spaces to the substrate about the leading lower end face of the leading shield part, the shield upper end face of the substrate side shield part, and the coil upper end face of the substrate side coil layer are formed to be equal to each other, so that no gap is formed between the leading lower end face, and the shield upper end face and the coil upper end face. This shortens the RWS and simplifies the manufacturing steps. Further, since the leading shield part has a tilted rear end face and a depth of the leading shield part is formed to be smaller than a depth of the substrate side shield part, the size of the leading shield part arranged near the main magnetic pole layer becomes smaller.

In case of the above-described thin-film magnetic head, it is preferable that the thin-film magnetic head further includes a middle insulating layer in direct contact with the tilted rear end face of the leading shield part and with the shield upper end face of the substrate side shield part.

Further, it is preferable that the middle insulating layer has a wrap-around structure wrapping around more to the medium-opposing surface side along the tilted rear end face than is a rising rear end face along the medium-opposing surface in the leading shield part.

By providing the above middle insulating layer, the magnetic flux become less likely to flow from the main magnetic pole layer to the leading shield part through the middle insulating layer.

Further, it is possible that the main magnetic pole layer has a lower tilted surface on the substrate side, the lower tilted surface is formed in a descending slope like shape closer to the substrate as the lower tilted surface is distanced more from the medium-opposing surface, and a depth of the leading shield part along the intersecting direction is formed to be smaller than a depth of the lower tilted surface along the intersecting direction.

This makes the size of the leading shield part arranged near the main magnetic pole layer much smaller.

Further, it is possible that the leading shield part has a tilted upper end face having a depth along the intersecting direction smaller than a depth of the leading lower end face, and the tilted upper end face is in contact with the main magnetic pole layer through the nonmagnetic thin-film.

In case of the above-described thin-film magnetic head, it is preferable that the thin-film magnetic head further includes a linking shield part in direct contact with a shield lower end face disposed at a position closest to the substrate in the substrate side shield part, and disposed at a position distanced from the medium-opposing surface; and an opposing insulating layer disposed on the medium-opposing surface side of the linking shield part, a linking shield front end face disposed at a position closest to the medium-opposing surface in the linking shield part is in direct contact with the opposing insulating layer.

Further, it is possible that the substrate side shield part is in direct contact with upper end faces disposed at positions most distanced from the substrate in both the opposing insulating layer and the linking shield part.

Furthermore, it is preferable that the thin-film magnetic head further includes a coil insulating layer in direct contact with the shield upper end face of the substrate side shield part and the coil upper end face of the substrate side coil layer, the leading shield part is in contact with a part, which the coil insulating layer does not touch, of the shield upper end face in the substrate side shield part.

It is preferable that the substrate side shield part is in contact with a closest coil part disposed at a position closest to the medium-opposing surface in the substrate side coil layer through an intervening insulating layer.

Further, it is preferable that the thin-film magnetic head further includes a coil insulating layer in contact with the shield upper end face of the substrate side shield part and the coil upper end face of the substrate side coil layer, the leading shield part is in contact with a part, which the coil insulating layer does not touch, of the shield upper end face in the substrate side shield part, and the middle insulating layer is in direct contact with the coil insulating layer.

Further, the present invention provides a method of manufacturing a thin-film magnetic head constructed such that a main magnetic pole layer having a magnetic pole end face on a side of a medium-opposing surface opposing a recording medium, a write shield layer having a write shield end face disposed in the medium-opposing surface, a gap layer formed between the main magnetic pole layer and write shield layer, and a thin-film coil wound around any of the main magnetic pole layer, the write shield layer or a shield magnetic layer connected the main magnetic pole layer are laminated on a substrate; the method including the following steps (1) to (8):

(1) a first magnetic layer forming step of forming a substrate side shield part to be arranged in the medium-opposing surface, and a first rear shield part to be arranged at a position distanced from the substrate side shield part along an intersecting direction intersecting the medium-opposing surface like perpendicular;

(2) a conductor layer forming step of forming a conductor layer, between the substrate side shield part and the first rear shield part, for forming a substrate side coil layer, disposed between the main magnetic pole layer and the substrate, in coil layers constituting the thin-film coil;

(3) a first common flat surface forming step of forming a first common flat surface including a coil upper end face to be disposed at a position most distanced from the substrate in the conductor layer, by planarization processing on the surface of the conductor layer;

(4) a second magnetic layer forming step of forming, directly on the first common flat surface, a leading magnetic layer and a second rear shield part in direct contact with the first rear shield part, the leading magnetic layer being a magnetic layer for forming a leading shield part having a leading front end face disposed in the medium-opposing surface and opposing the main magnetic pole layer through a nonmagnetic thin-film on the substrate side of the main magnetic pole layer, and having a depth along the intersecting direction smaller than a depth of the substrate side shield part;

(5) a rear end face forming step of removing a part of a rear end face in the leading magnetic layer separated from the medium-opposing surface to form, in the leading magnetic layer, a rising rear end face along the medium-opposing surface and a tilted rear end face tilted to come closer to the medium-opposing surface than is the rising rear end face;

(6) a second common flat surface forming step of forming a second common flat surface by performing planarization processing on the surface of the multilayer body after forming an insulating layer on a surface of the multilayer body;

(7) a leading shield part forming step of etching the second common flat surface according to a form of the main magnetic pole layer to make the leading magnetic layer into the leading shield part; and (8) a main magnetic pole layer forming step of forming the main magnetic pole layer after forming a nonmagnetic thin-film on the surface of the leading shield part.

It is preferable that in case of the above-described method of manufacturing, in the leading shield part forming step, etching is performed on the second common flat surface to form a middle insulating layer wrapping around more to the medium-opposing surface side than is the rising rear end face.

Further, it is preferable that the above-described method of manufacturing further includes a linking shield part forming step of forming a linking shield part to be disposed at a position distanced from the medium-opposing surface, on the side closer to the substrate than the substrate side shield part, the first magnetic layer forming step is performed such that the substrate side shield part and the first rear shield part are directly connected to the linking shield part.

Further, it is preferable that in case of the above-described method of manufacturing, the leading shield part forming step is performed such that etching is performed on the second common flat surface to obtain a descending slope in which a height in a direction along the medium-opposing surface decreases as a position on the descending slope is distanced more from the medium-opposing surface.

Further, it is preferable that a coil insulating layer forming step is performed after the first common flat surface forming step is performed, a coil insulating layer, in contact with a shield upper end face in direct contact with the leading shield part in the substrate side shield part and with a coil upper end face to be disposed at a position most distanced from the substrate in the substrate side coil layer, is formed in the coil insulating layer forming step.

Further, it is preferable that in the above-described method of manufacturing, the second magnetic layer forming step is performed, after the coil insulating layer forming step is performed.

Further, the present invention provides a head gimbal assembly including a thin-film magnetic head formed on a support and a gimbal for securing the support; the thin-film magnetic head is constructed such that a main magnetic pole layer having a magnetic pole end face on a side of a medium-opposing surface opposing a recording medium, a write shield layer having a write shield end face disposed in the medium-opposing surface, a gap layer formed between the main magnetic pole layer and write shield layer, and a thin-film coil wound around any of the main magnetic pole layer, the write shield layer or a shield magnetic layer connected the main magnetic pole layer are laminated on a substrate, the thin-film coil includes a substrate side coil layer disposed between the main magnetic pole layer and the substrate, the shield magnetic layer including a leading shield part having a leading front end face disposed in the medium-opposing surface, and opposing the main magnetic pole layer through a nonmagnetic thin-film on the substrate side of the main magnetic pole layer; and a substrate side shield part having a shield upper end face in direct contact with a leading lower end face disposed at a position closest to the substrate in the leading shield part, and a shield front end face disposed in the medium-opposing surface, spaces to the substrate about the leading lower end face of the leading shield part, the shield upper end face of the substrate side shield part, and a coil upper end face disposed at a position most distanced from the substrate in the substrate side coil layer are formed to be equal to each other, the leading shield part has a tilted rear end face tilted to come closer to the medium-opposing surface toward the main magnetic pole layer, and a depth of the leading shield part along an intersecting direction intersecting the medium-opposing surface like perpendicular is formed to be smaller than a depth of the substrate side shield part along the intersecting direction.

Further, the present invention provides a hard disk drive including a head gimbal assembly having a thin-film magnetic head and a recording medium opposing the thin-film magnetic head; the thin-film magnetic head is constructed such that a main magnetic pole layer having a magnetic pole end face on a side of a medium-opposing surface opposing a recording medium, a write shield layer having a write shield end face disposed in the medium-opposing surface, a gap layer formed between the main magnetic pole layer and write shield layer, and a thin-film coil wound around any of the main magnetic pole layer, the write shield layer or a shield magnetic layer connected the main magnetic pole layer are laminated on a substrate: the thin-film coil includes a substrate side coil layer disposed between the main magnetic pole layer and the substrate, the shield magnetic layer including: a leading shield part having a leading front end face disposed in the medium-opposing surface, and opposing the main magnetic pole layer through a nonmagnetic thin-film on the substrate side of the main magnetic pole layer; and a substrate side shield part having a shield upper end face in direct contact with a leading lower end face disposed at a position closest to the substrate in the leading shield part, and a shield front end face disposed in the medium-opposing surface, spaces to the substrate about the leading lower end face of the leading shield part, the shield upper end face of the substrate side shield part, and a coil upper end face disposed at a position most distanced from the substrate in the substrate side coil layer are formed to be equal to each other, the leading shield part has a tilted rear end face tilted to come closer to the medium-opposing surface toward the main magnetic pole layer, and a depth of the leading shield part along an intersecting direction intersecting the medium-opposing surface like perpendicular is formed to be smaller than a depth of the substrate side shield part along the intersecting direction.

The present invention will be more fully understood from the detailed description given hereinbelow and the accompanying drawings which are given by way of illustration only, and thus are not to be considered as limiting the present invention.

DETAILED DESCRIPTION OF THE EMBODIMENTS

In the following, embodiments of the present invention will be described with reference to the drawings. Note that the same components will be referred to with the same numerals or letters, while omitting their overlapping descriptions.

Structures of Thin-Film Magnetic Head

Figure 1:
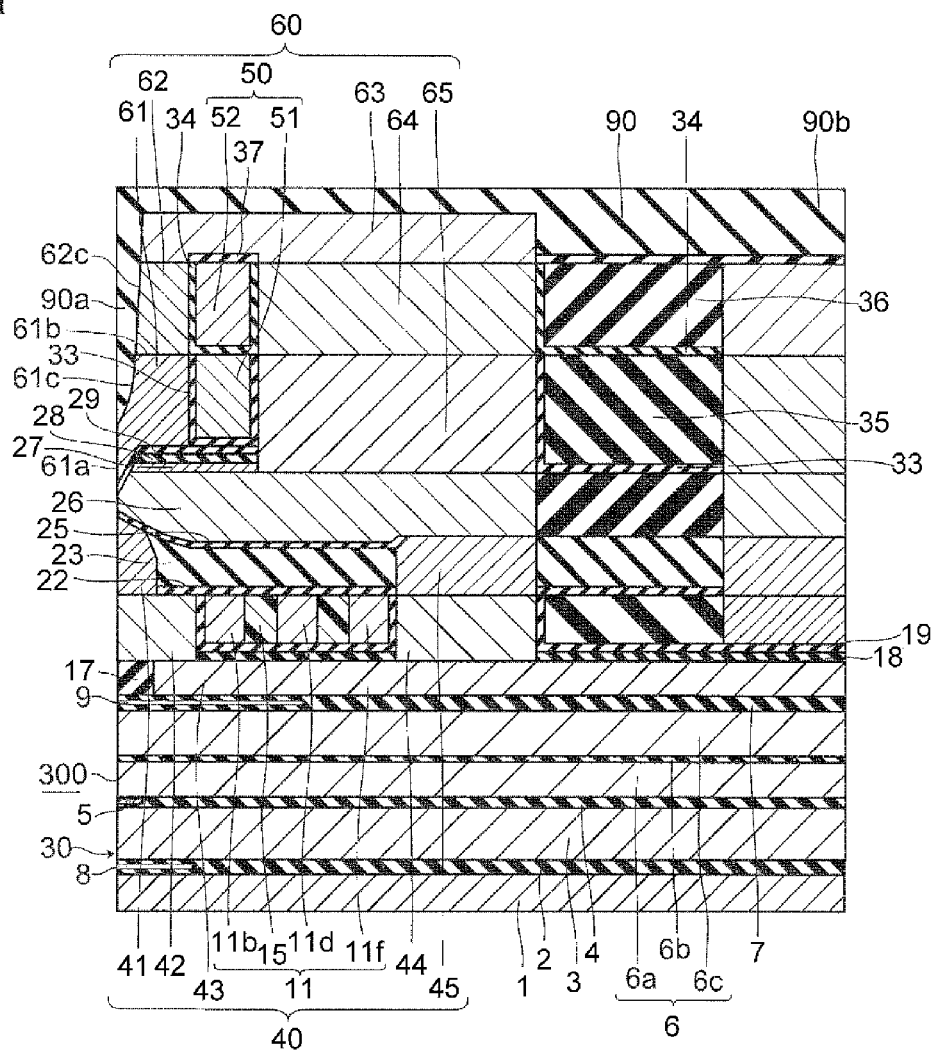
FIG. 1 is a sectional view of the thin-film magnetic head according to an embodiment of the present invention taken along the line 1-1 of FIG. 2, along by a direction intersecting its air bearing surface.
Figure 2:
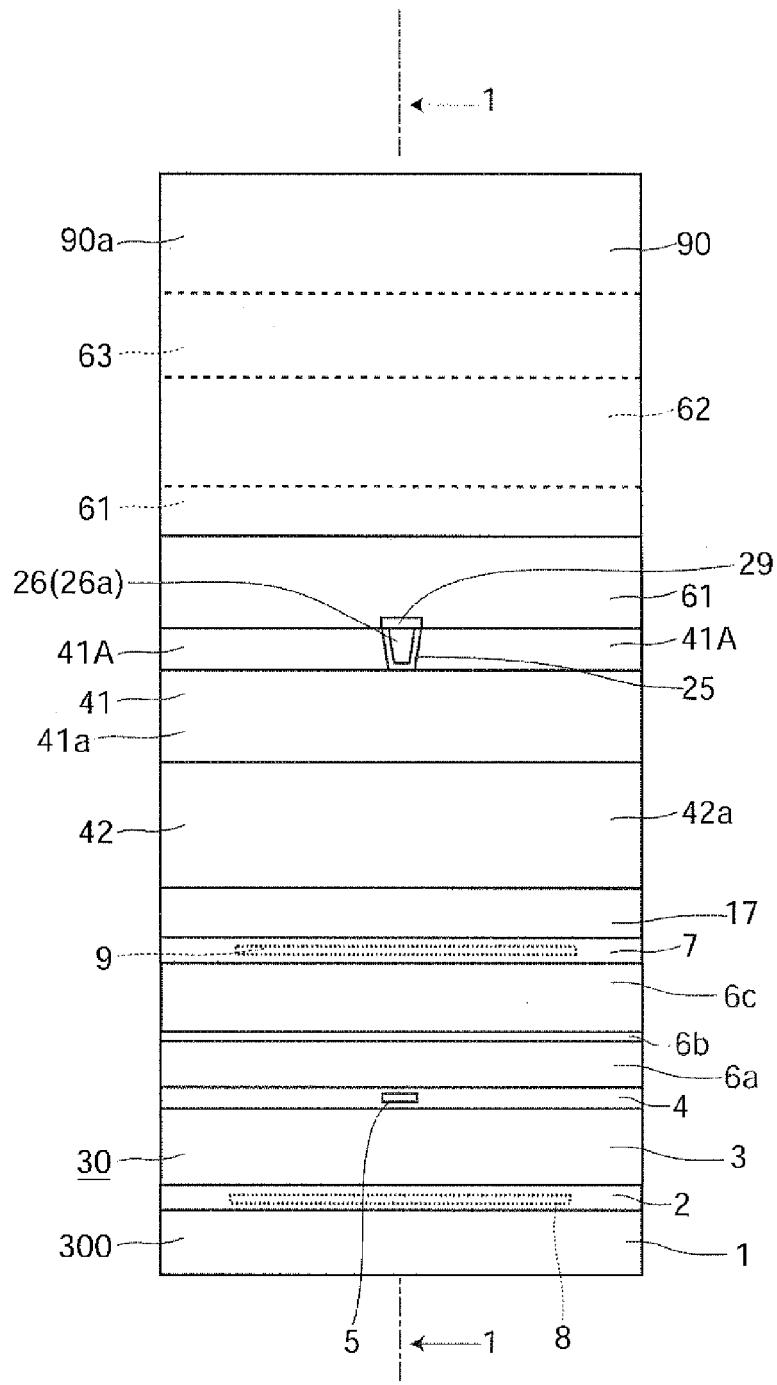
FIG. 2 is a front view illustrating an ABS of the thin-film magnetic head.
Figure 3:
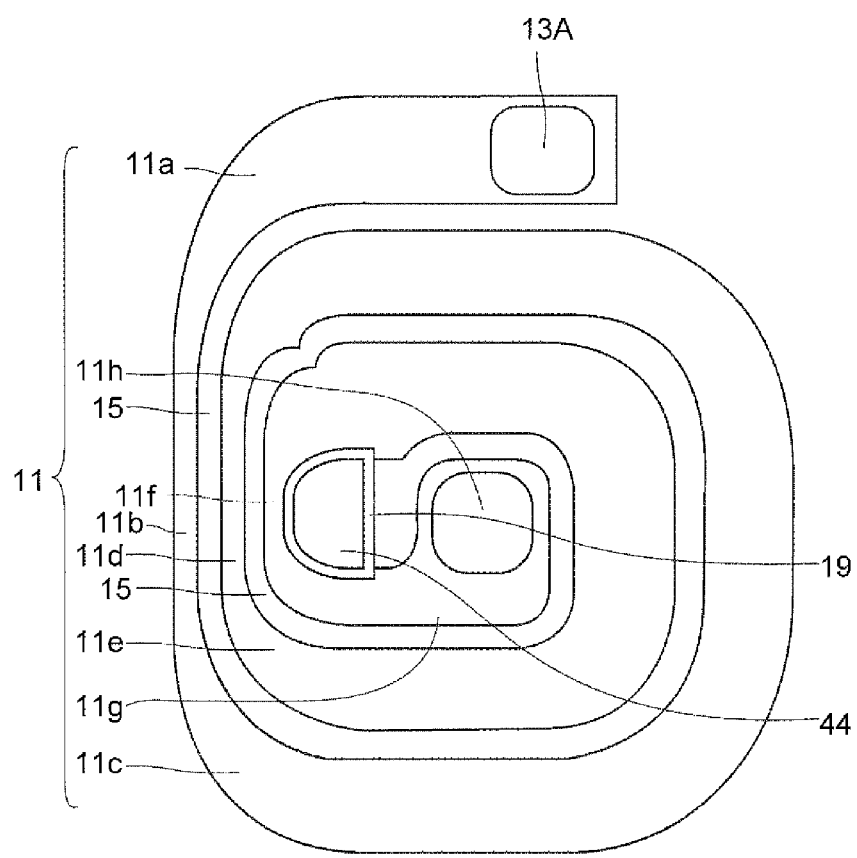
FIG. 3 is a plan view illustrating a lower thin-film coil.
Figure 4:
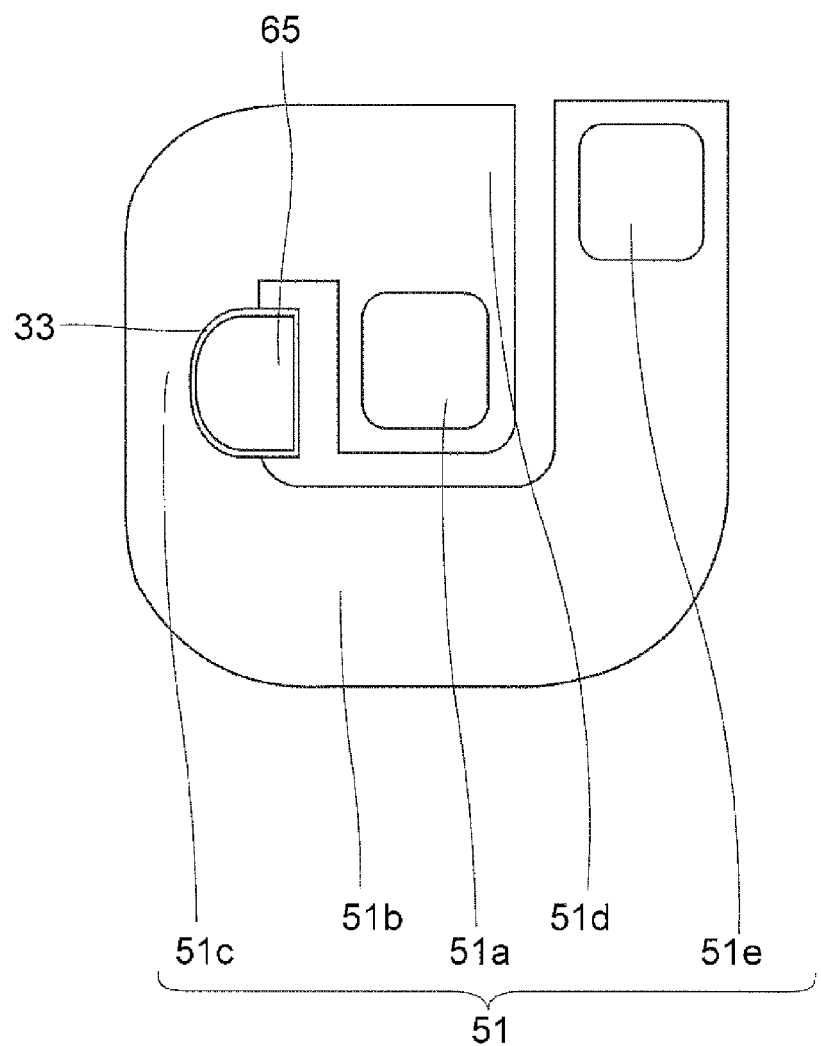
FIG. 4 is a plan view illustrating a principal part of an upper thin-film coil.
Figure 5:
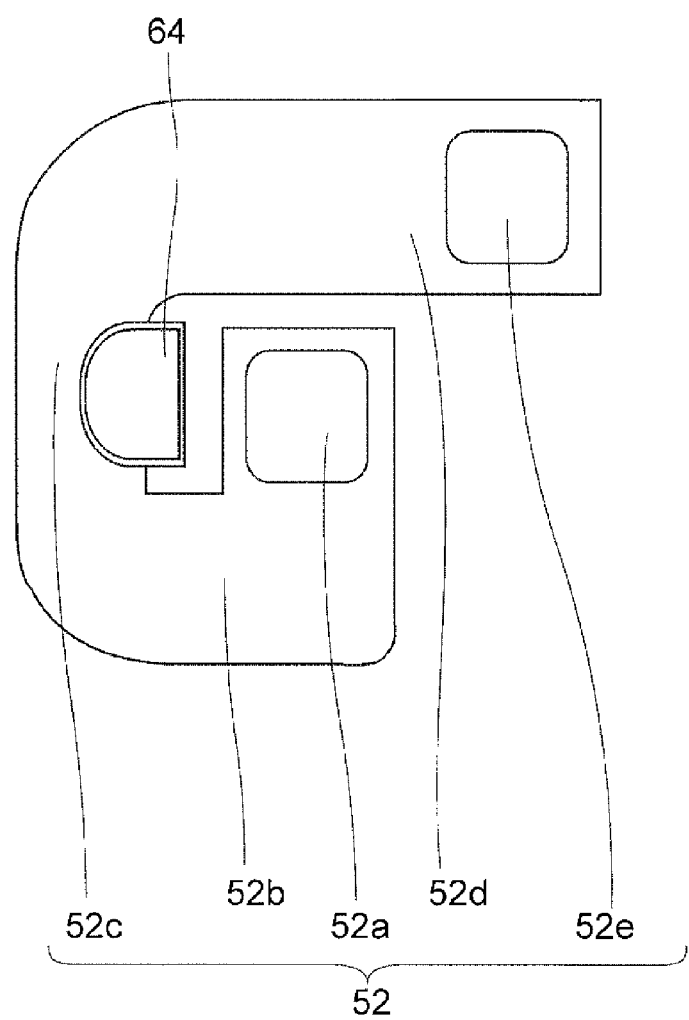
FIG. 5 is a plan view illustrating an another principal part of the upper thin-film coil.
Figure 6:
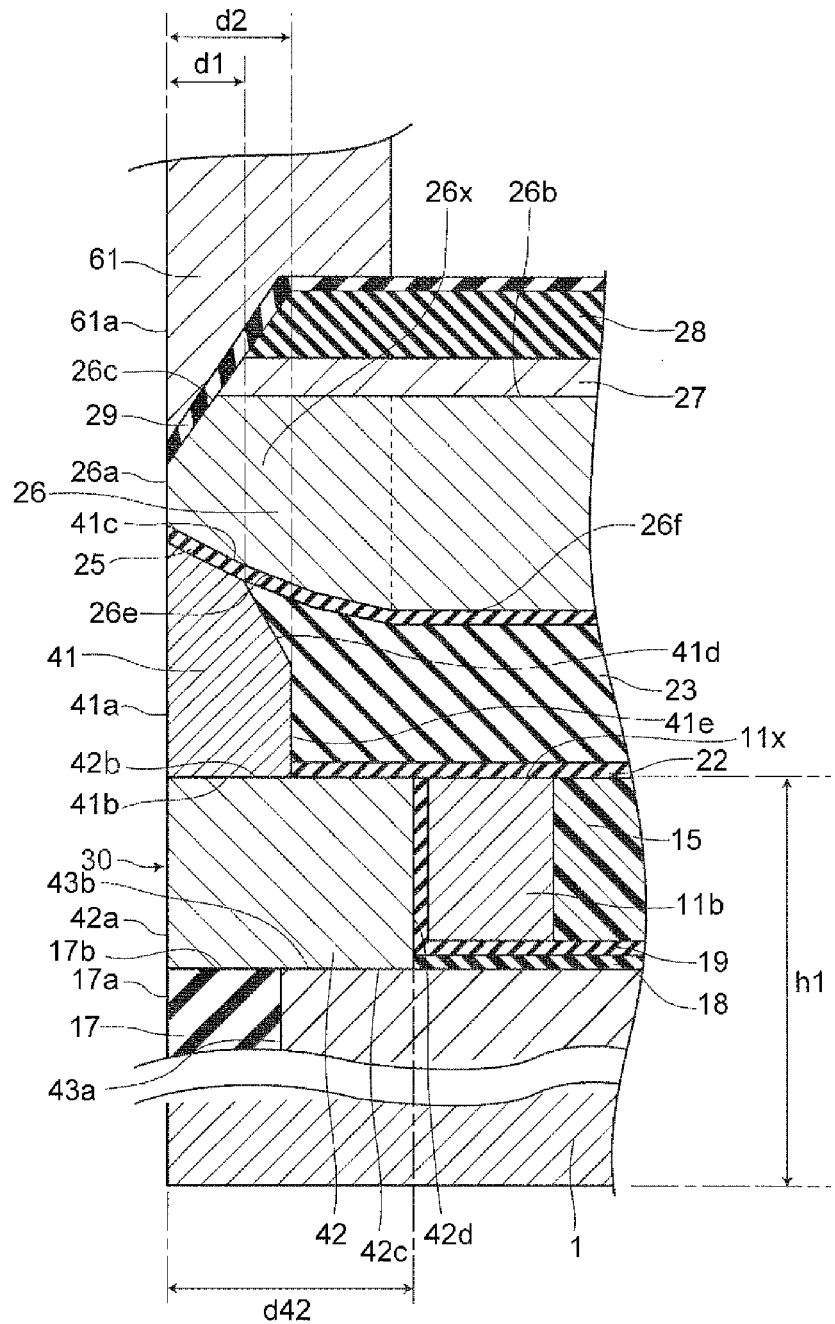
FIG. 6 is a sectional view illustrating a principal part of FIG. 1.
Figure 7:
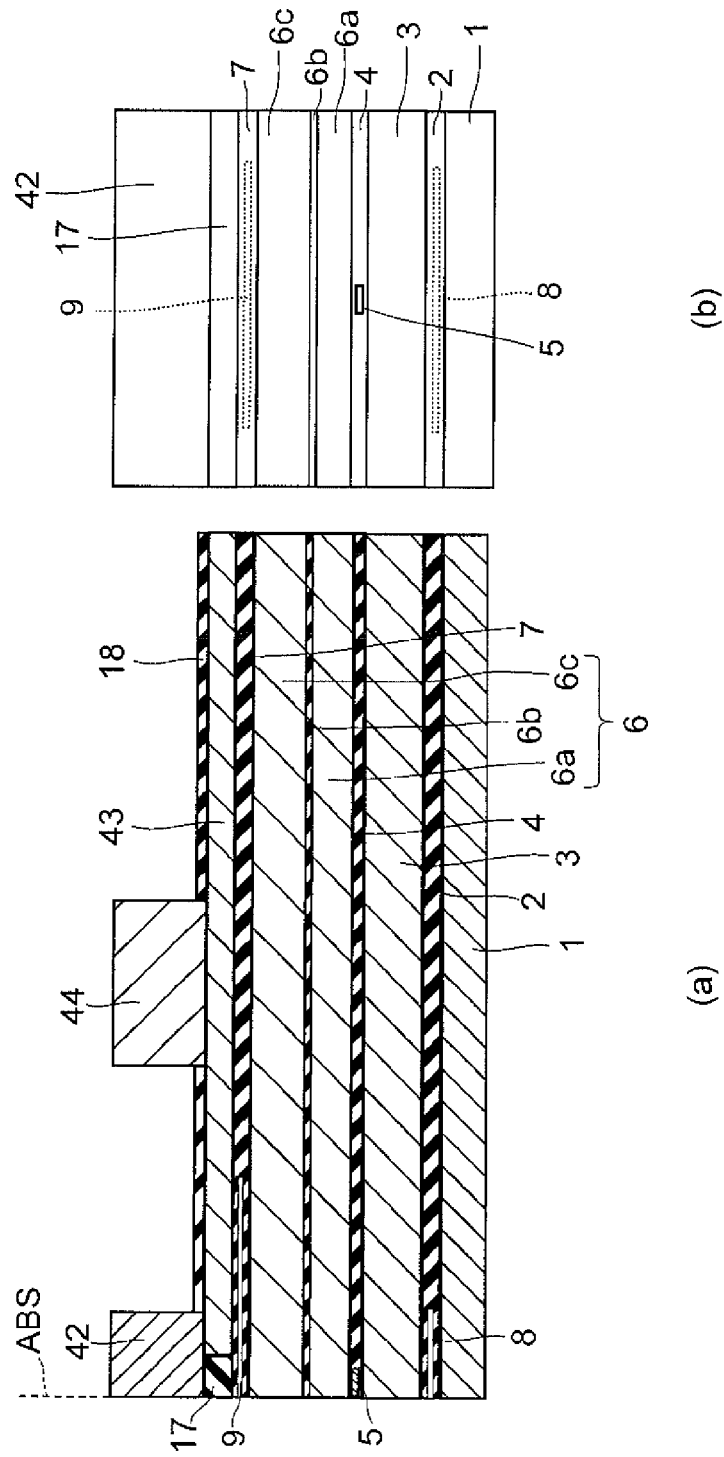
FIG. 7 illustrates a step of manufacturing the thin-film magnetic head illustrated in FIG. 1, in which (a) is a sectional view corresponding to FIG. 1, in which (b) is a front view corresponding to FIG. 2.
Figure 8:
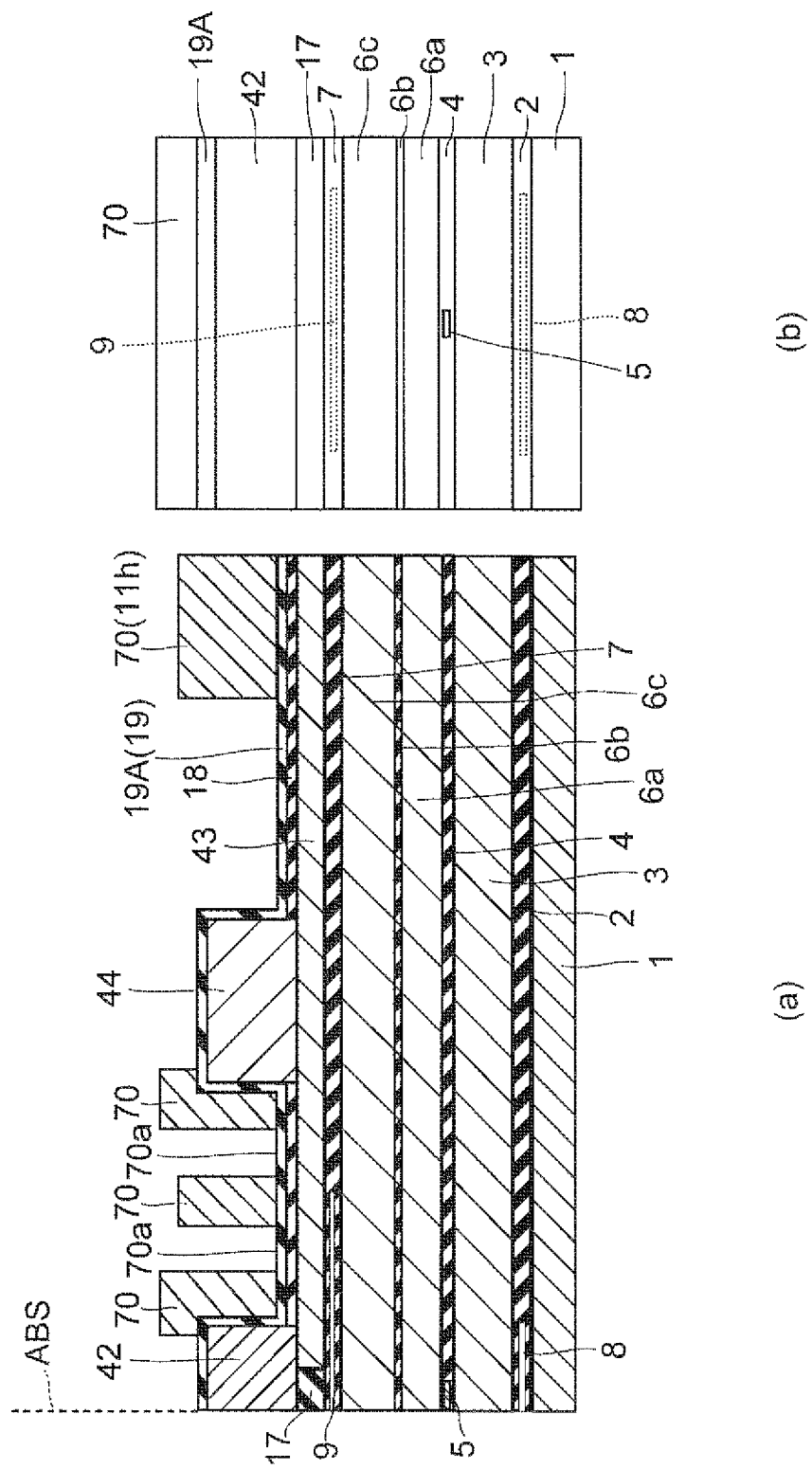
FIG. 8 illustrates a step subsequent to that of FIG. 7, in which (a) is a sectional view corresponding to FIG. 1, in which (b) is a front view corresponding to FIG. 2.
Figure 9:
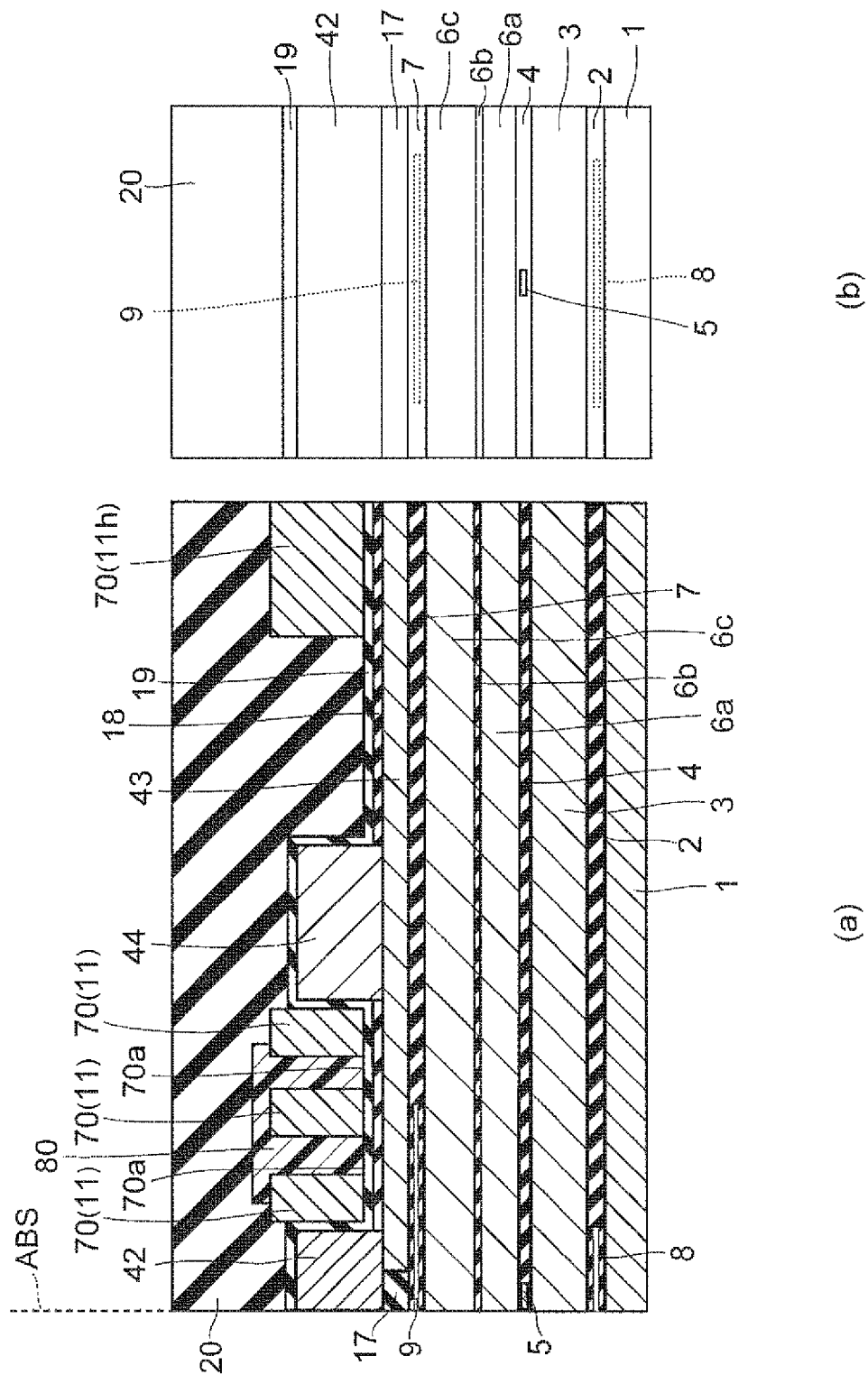
FIG. 9 illustrates a step subsequent to that of FIG. 8, in which (a) is a sectional view corresponding to FIG. 1, in which (b) is a front view corresponding to FIG. 2.
Figure 10:
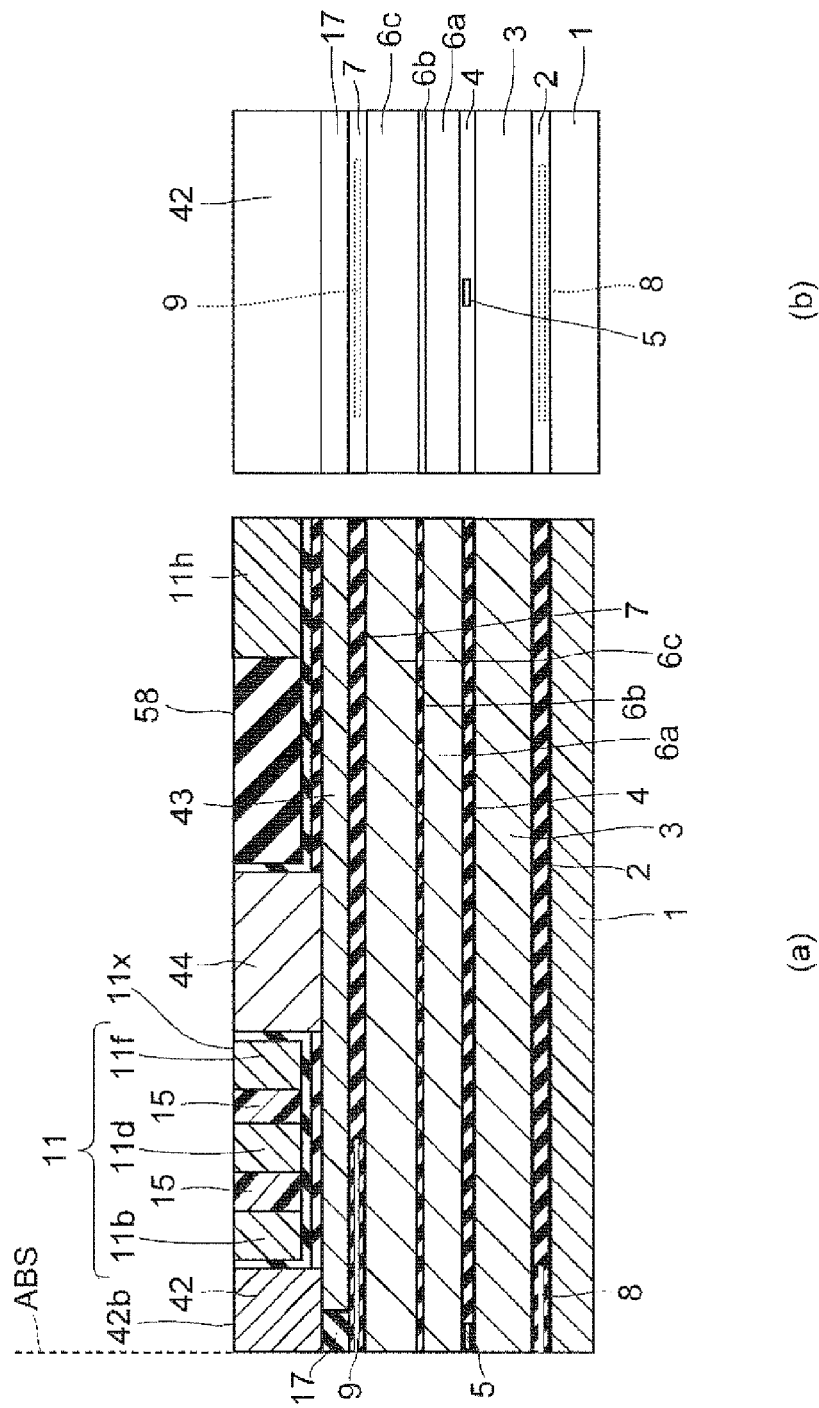
FIG. 10 illustrates a step subsequent to that of FIG. 9, in which (a) is a sectional view corresponding to FIG. 1, in which (b) is a front view corresponding to FIG. 2.
Figure 11:
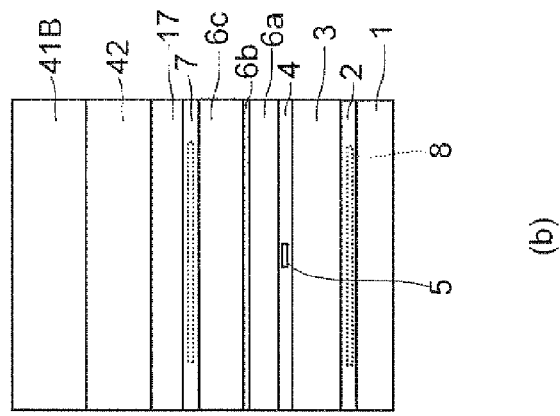
FIG. 11 illustrates a step subsequent to that of FIG. 10, in which (a) is a sectional view corresponding to FIG. 1, in which (b) is a front view corresponding to FIG. 2.
Figure 11:
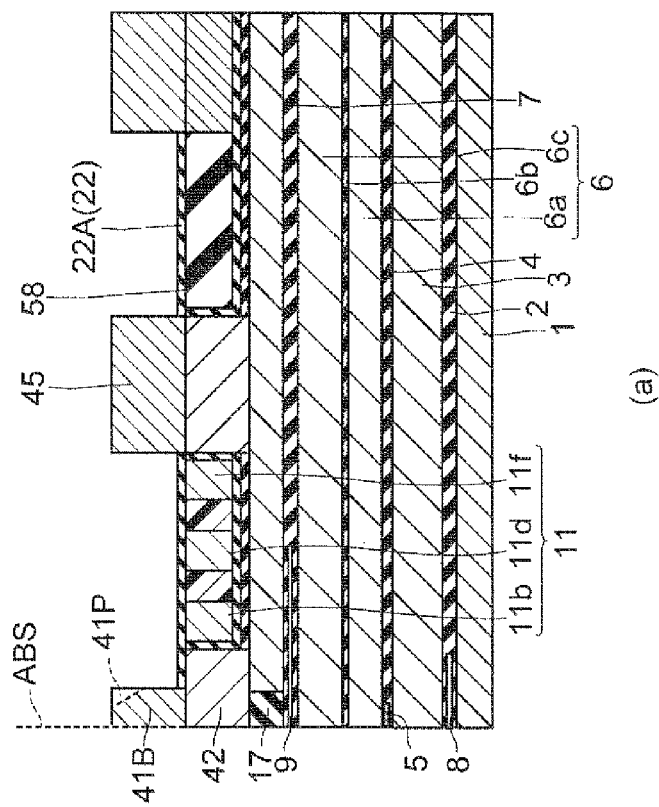
Figure 12:
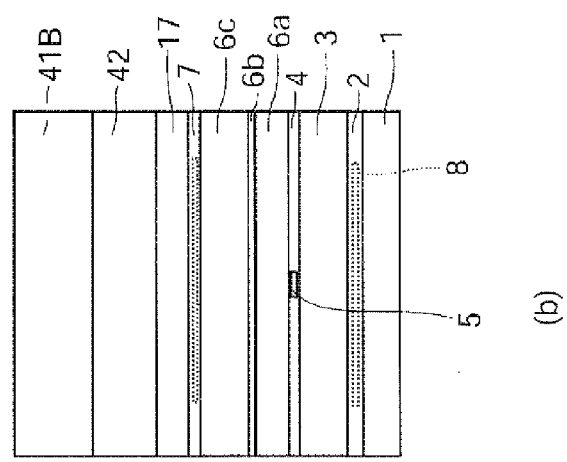
FIG. 12 illustrates a step subsequent to that of FIG. 11, in which (a) is a sectional view corresponding to FIG. 1, in which (b) is a front view corresponding to FIG. 2.
Figure 12:
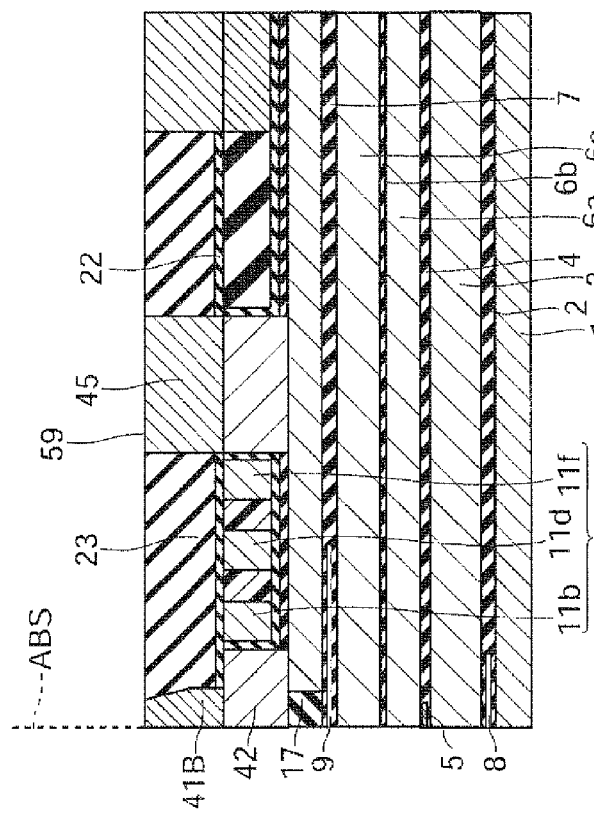
Figure 13:
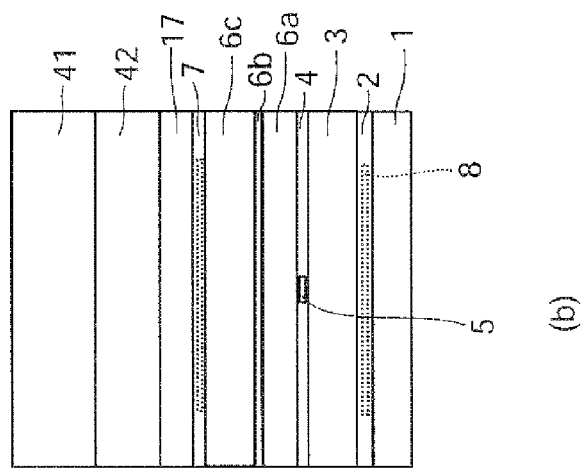
FIG. 13 illustrates a step subsequent to that of FIG. 12, in which (a) is a sectional view corresponding to FIG. 1, in which (b) is a front view corresponding to FIG. 2.
Figure 13:
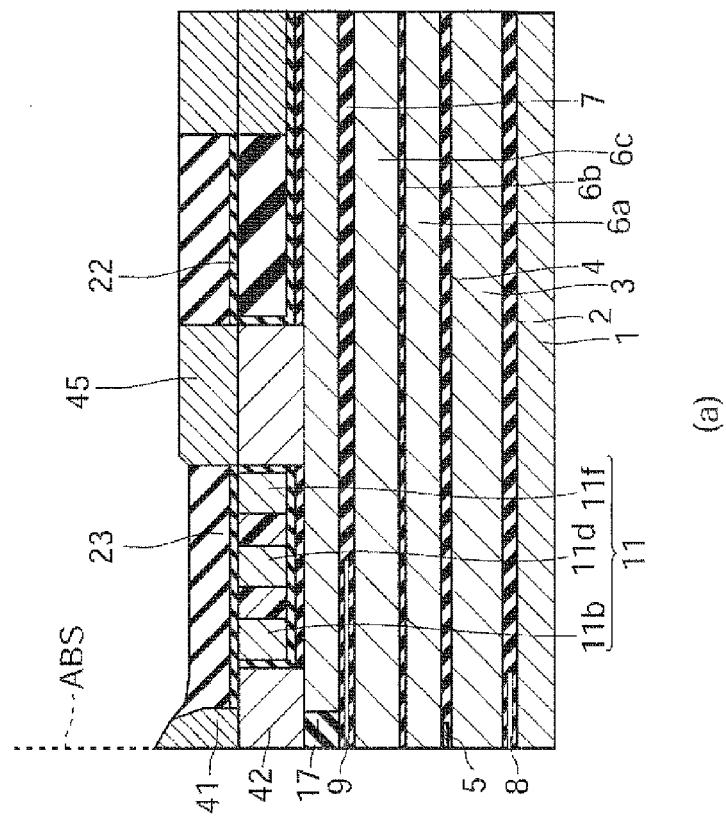
Figure 14:
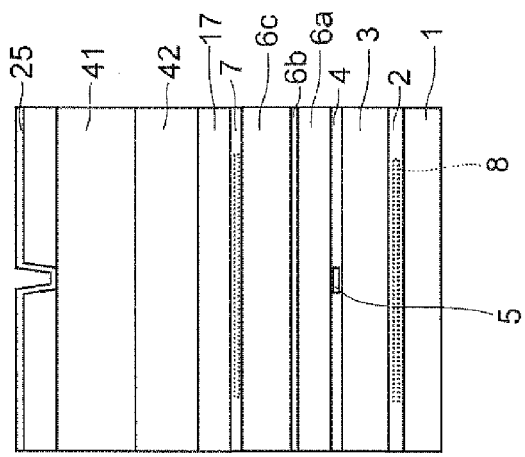
FIG. 14 illustrates a step subsequent to that of FIG. 13, in which (a) is a sectional view corresponding to FIG. 1, in which (b) is a front view corresponding to FIG. 2.
Figure 14:
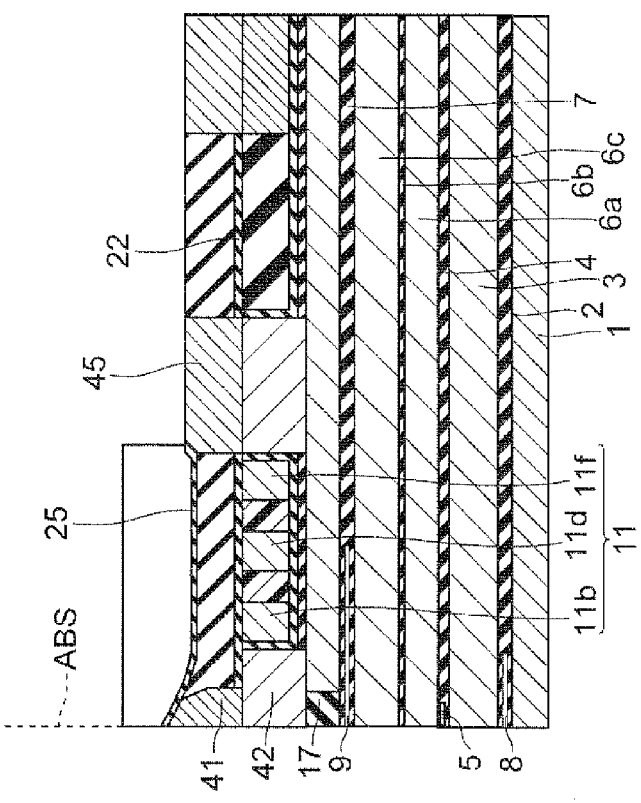
Figure 15:
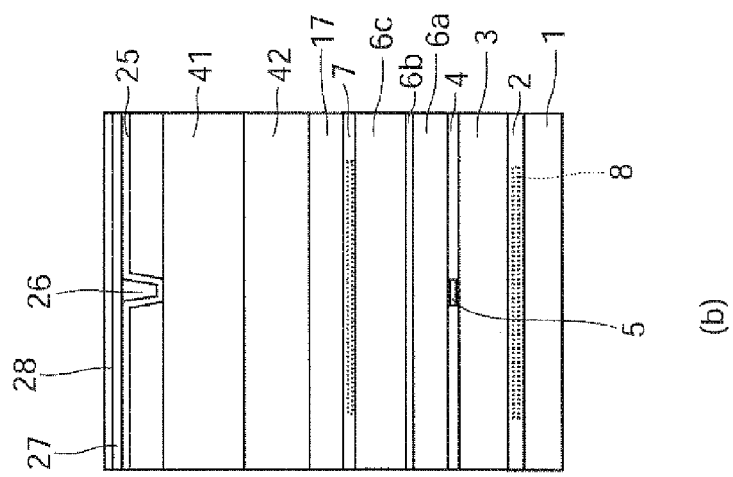
FIG. 15 illustrates a step subsequent to that of FIG. 14, in which (a) is a sectional view corresponding to FIG. 1, in which (b) is a front view corresponding to FIG. 2.
Figure 15:
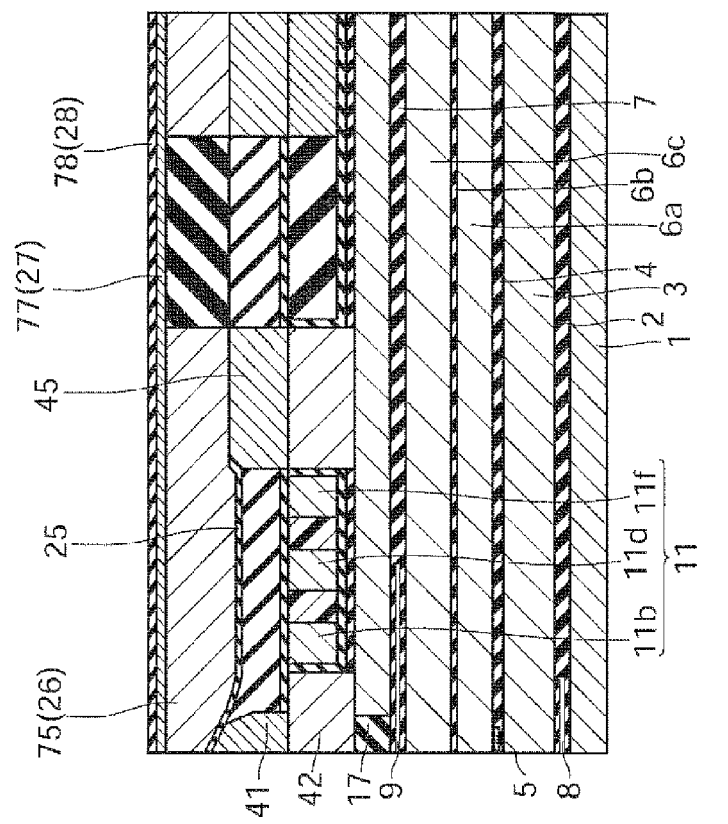
Figure 16:
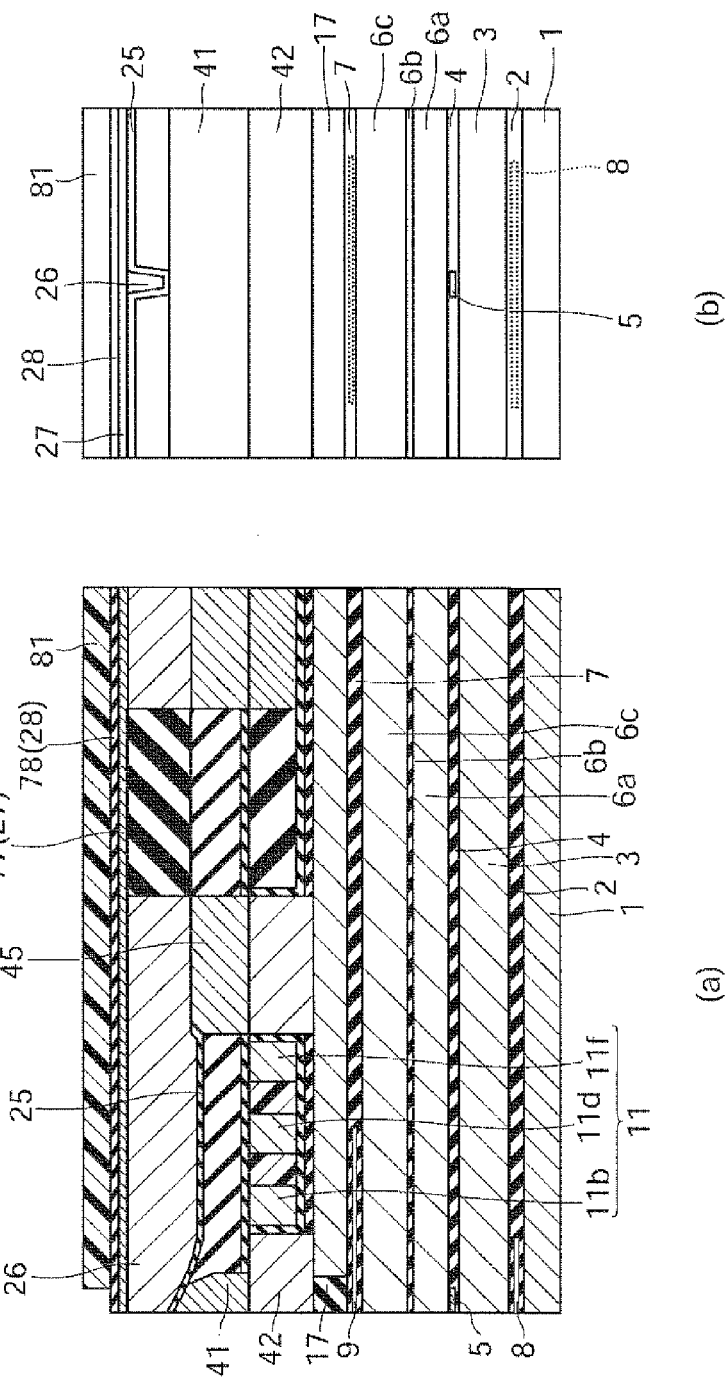
FIG. 16 illustrates a step subsequent to that of FIG. 15, in which (a) is a sectional view corresponding to FIG. 1, in which (b) is a front view corresponding to FIG. 2.
Figure 17:
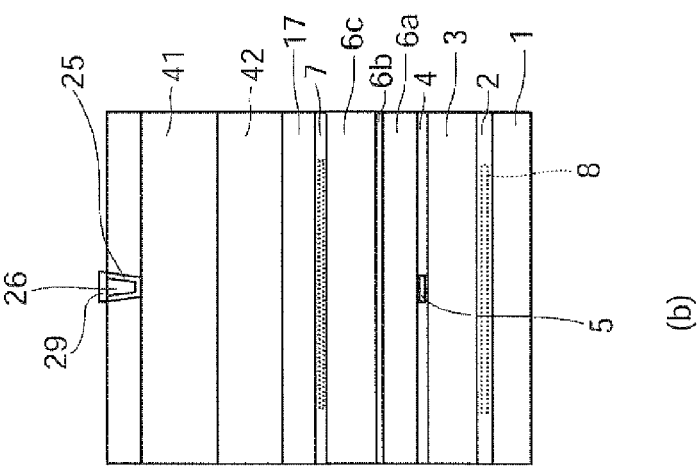
FIG. 17 illustrates a step subsequent to that of FIG. 16, in which (a) is a sectional view corresponding to FIG. 1, in which (b) is a front view corresponding to FIG. 2.
Figure 17:
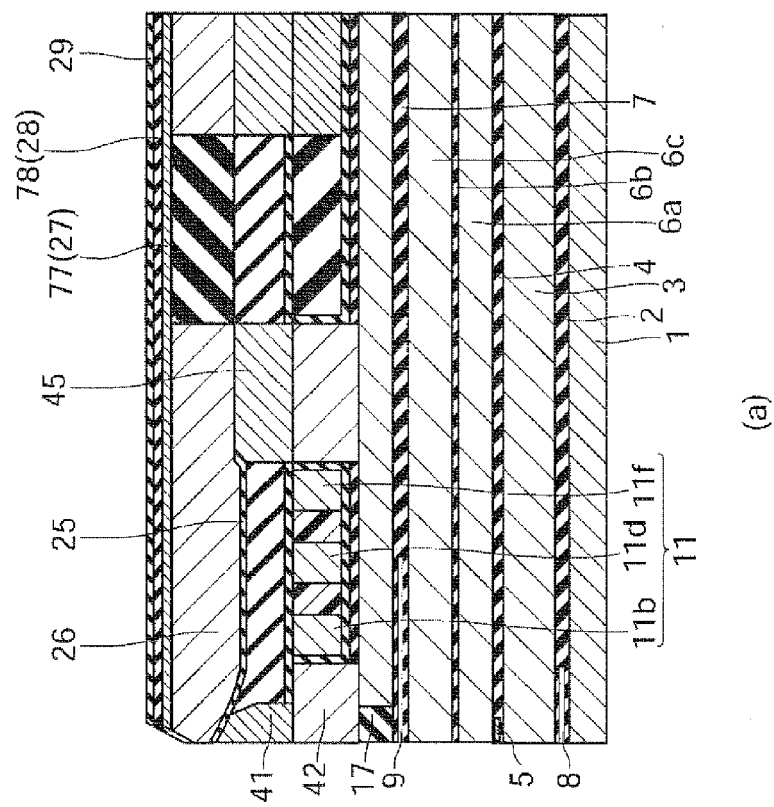
Figure 18:
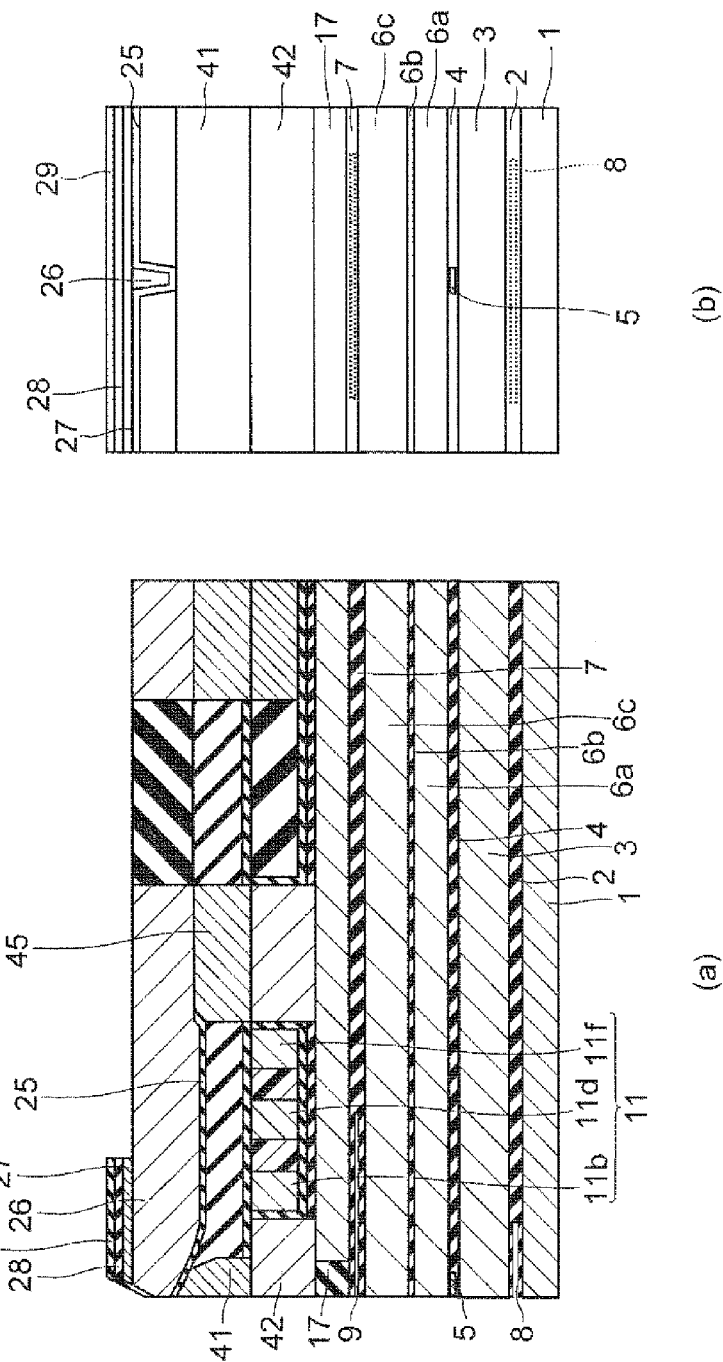
FIG. 18 illustrates a step subsequent to that of FIG. 17, in which (a) is a sectional view corresponding to FIG. 1, in which (b) is a front view corresponding to FIG. 2.
Figure 19:
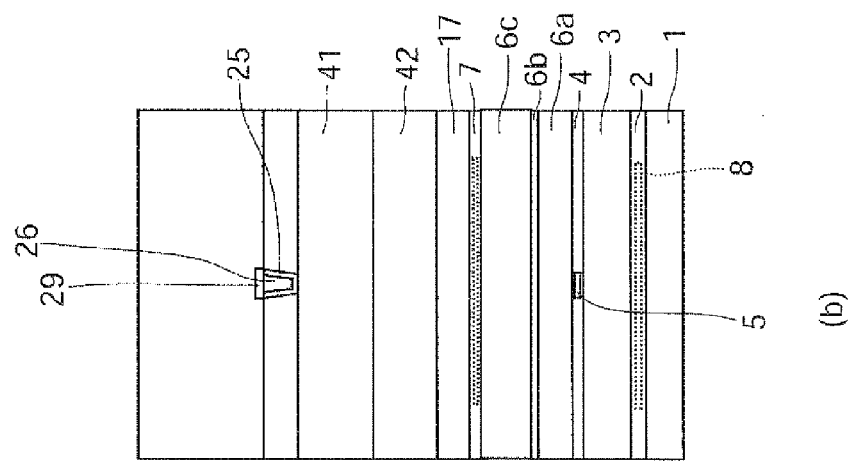
FIG. 19 illustrates a step subsequent to that of FIG. 18, in which (a) is a sectional view corresponding to FIG. 1, in which (b) is a front view corresponding to FIG. 2.
Figure 19:
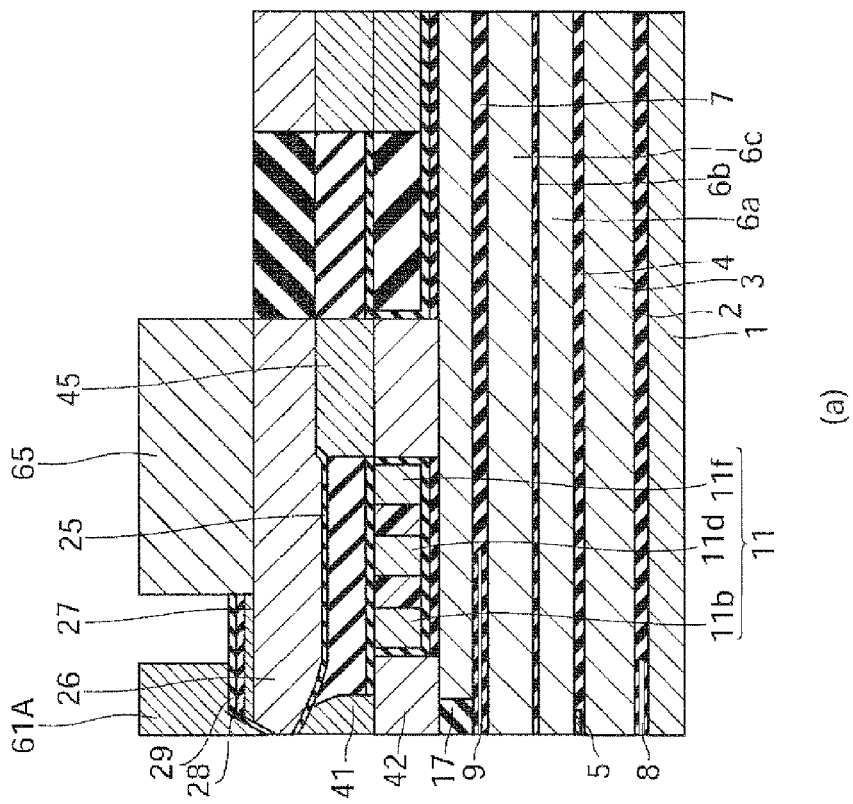
Figure 20:
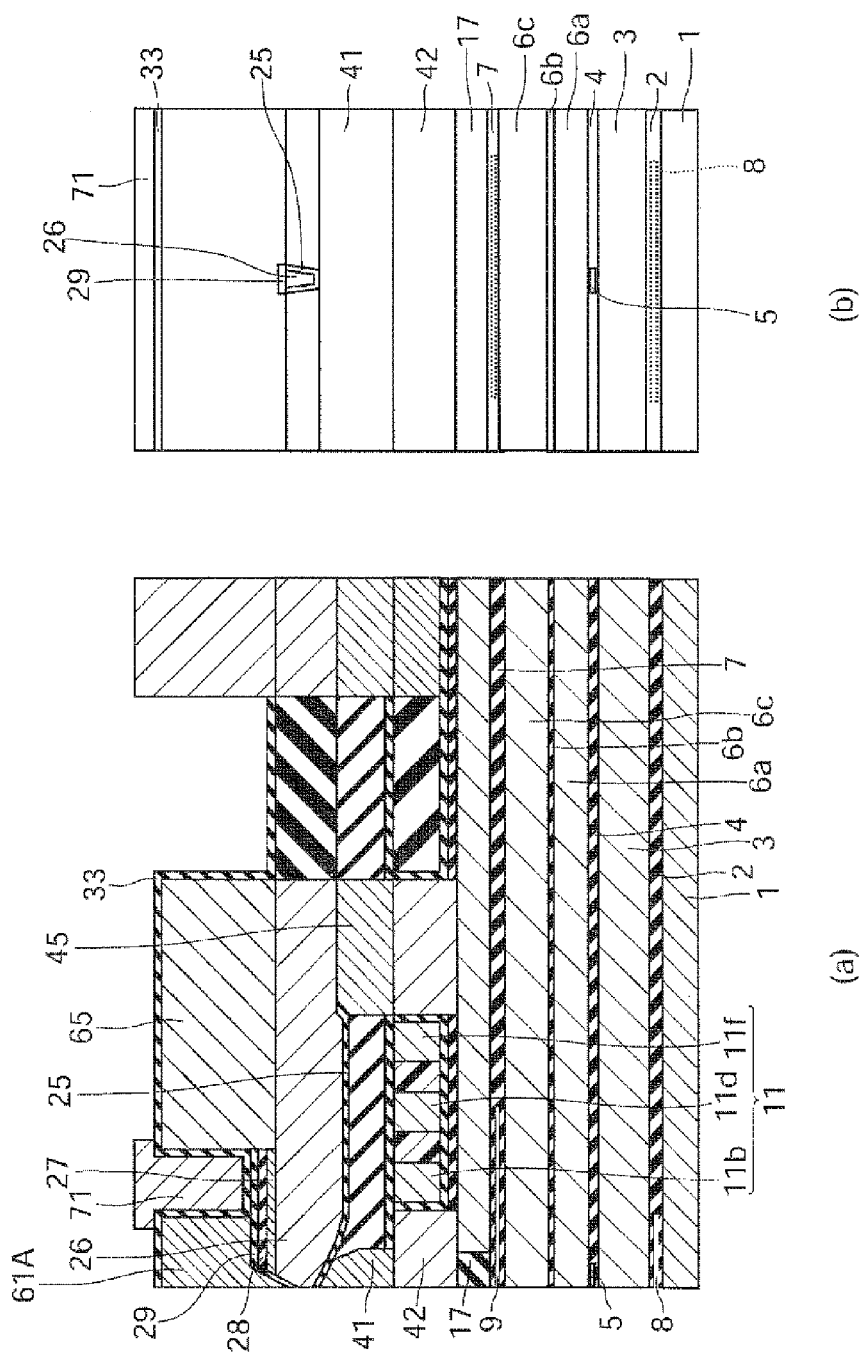
FIG. 20 illustrates a step subsequent to that of FIG. 19, in which (a) is a sectional view corresponding to FIG. 1, in which (b) is a front view corresponding to FIG. 2.
Figure 21:
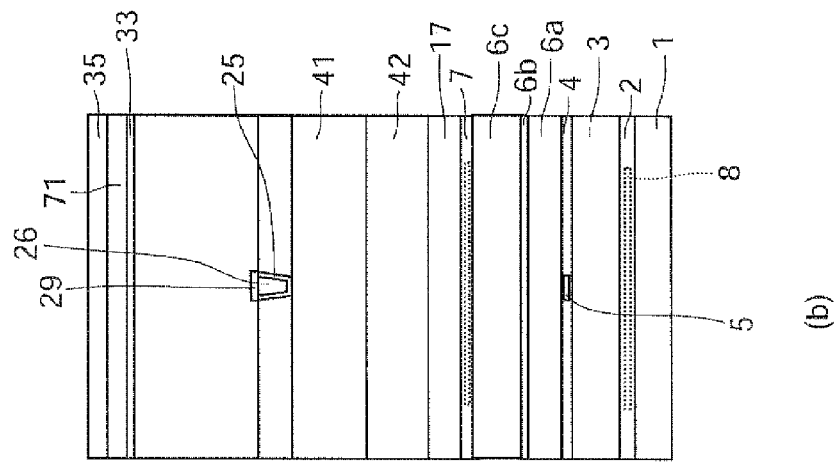
FIG. 21 illustrates a step subsequent to that of FIG. 20, in which (a) is a sectional view corresponding to FIG. 1, in which (b) is a front view corresponding to FIG. 2.
Figure 21:
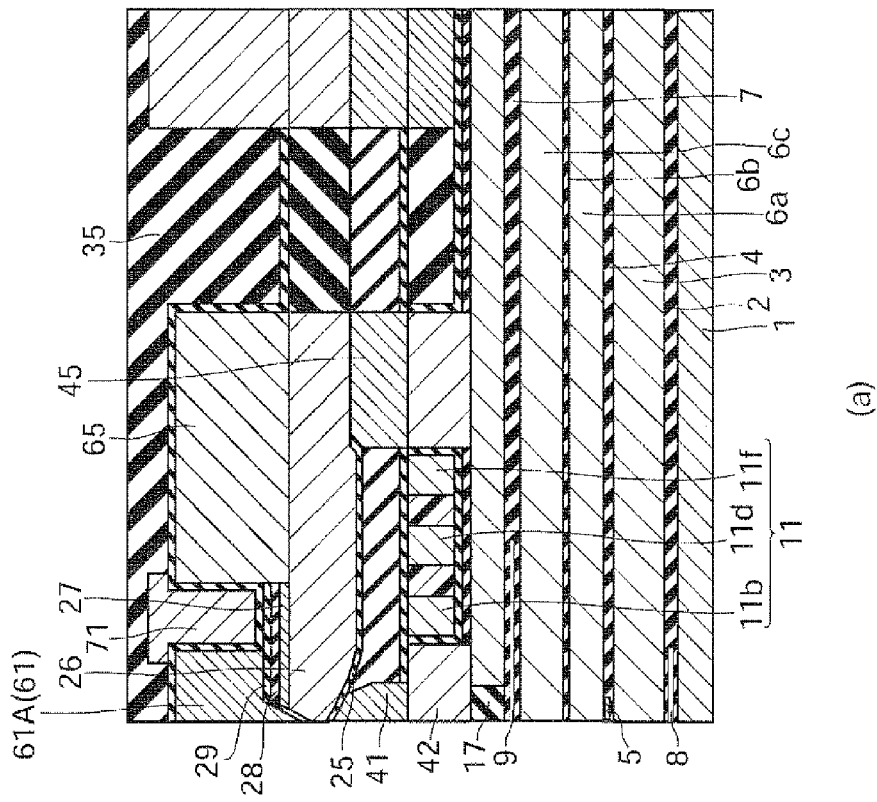

To begin with, the structure of a thin-film magnetic head of perpendicular magnetic recording type according to the first embodiment of the present invention will be explained with reference to FIG. 1 to FIG. 6. Here, FIG. 1 is a sectional view of the thin-film magnetic head 300 according to an embodiment of the present invention taken along the line 1-1 of FIG. 2, along by a direction intersecting its air bearing surface (which will hereinafter be referred to as "ABS"), FIG. 2 is a front view illustrating the ABS 30 of the thin-film magnetic head 300. FIG. 3 is a plan view illustrating a lower thin-film coil 11. FIG. 4 is a plan view illustrating a first coil layer 51. FIG. 5 is a plan view illustrating a second coil layer 52. FIG. 6 is a sectional view illustrating a principal part of FIG. 1.

The thin-film magnetic head 300 has a leading shield part 41 and a substrate side shield part 42, and the spaces to the substrate 1 about a leading lower end face 41b of the leading shield part 41, a shield upper end face 42b of the substrate side shield part 42 and a coil upper end face 11x of the lower thin-film coil 11 are equal to each other, and all of them are formed so that the space with respect to the substrate 1 is the height h1.

Two magnetic layers 712, 713 exist between the leading shield part 711 and the linking shield part 714 in the conventional thin-film magnetic head 800.

However, since the leading shield part 41 and a linking shield part 43 are connected to each other only by the substrate side shield part 42 in the thin-film magnetic head 300, the manufacturing steps can be simplified and the RWS can be shortened accordingly to the reduced number of magnetic layers necessary for the connection of them.

Further, since the leading shield part 41 has a tilted rear end face 41d and a depth d2 of the leading shield part 41 is formed to be smaller than a depth d42 of the substrate side shield part 42, less magnetic flux leaks from the main magnetic pole layer 26 to the leading shield part 41 to avoid the situation that WATE, ATE are likely to occur.

Then, the thin-film magnetic head 300 comprises a substrate 1 and reproducing head and recording head laminated on the substrate 1, while having the ABS 30 as a medium-opposing surface opposing a recording medium. The following will explain structures of main parts of the thin-film magnetic head 300, while structures of parts other than the main parts will later be explained in manufacturing steps.

The reproducing head has an MR device 5, arranged near the ABS 30, for detecting a magnetic signal. The reproducing head has an insulating layer 2 formed on the substrate 1, a lower shield layer 3 made of a magnetic material, and a shield gap film 4 shielding the MR device 5. The reproducing head further has an upper shield layer 6 made of a magnetic material formed on the shield gap film 4, and an insulating layer 7 formed on the upper shield layer 6. The reproducing head is arranged in a position closer to the substrate 1 than the recording head.

The MR device 5 is constituted by a magnetosensitive film exhibiting a magnetoresistive effect, such as AMR (anisotropic magnetoresistive), GMR (giant magnetoresistive), and TMR (tunneling magnetoresistive) devices.

The upper shield layer 6 has an insulating part 6b in the middle thereof. Further, a first shield part 6a is formed on the lower side of the insulating part 6b and a second shield part 6c is formed on the upper side of the insulating part 6b.

In the thin-film magnetic head 300, a heating part 8 is formed in the insulating layer 2. The heating part 8 is also called a DFH (Disk flying heater) and has a function of generating heat by electric current flowing therethrough and conducting the heat to the upper shield layer 6 and the like. Further, a heat sensing part 9 is formed in the insulating layer 7. The heat sensing part 9 is also called an HDI (Head Disk Interlayer) sensor. The heat sensing part 9 is formed using an element which senses heat (temperature) near the upper shield layer 6 and changes in resistance value according to the sensed heat.

Further, in the thin-film magnetic head 300, the heating part 8 heats the upper shield layer 6 and the lower shield layer 3. The upper shield layer 6 and the lower shield layer 3 expand in volume by the heat received from the heating part 8. As a result, assuming that the upper shield layer 6 and the lower shield layer 3 come into contact with a recording medium not illustrated in FIG. 1, parts of the upper shield layer 6 and the lower shield layer 3 near the ABS 30 become heated due to friction.

In the thin-film magnetic head 300, a judgment whether or not the upper shield layer 6 and the lower shield layer 3 have come into contact with the recording medium is made by detecting the change in resistance value of the heat sensing part 9 caused by the friction heat. Further, the frying height is controlled while controlling the current value flowing through the heating part 8 according to the judgment result.

The recording head has the lower thin-film coil 11, an opposing insulating layer 17, a coil insulating layer 22, a middle insulating layer 23, a main magnetic pole layer 26, a gap layer 29, a shield magnetic layer 40, an upper thin-film coil 50, an write shield layer 60 and protective insulating layer 90, and it has a structure which they are laminated on the substrate 1.

In the thin-film magnetic head 300, the lower thin-film coil 11 and the upper thin-film coil 50 form a continuous thin-film coil. The lower thin-film coil 11 corresponds to a part of the continuous thin-film coil, disposed between the main magnetic pole layer 26 and the substrate 1. Therefore, the lower thin-film coil 11 corresponds to a substrate side coil layer according to the embodiment of the present invention. Further, a part disposed at a position most distanced from the substrate 1 in the lower thin-film coil 11 is the coil upper end face 11x as illustrated in FIG. 6.

As illustrated in FIG. 3, the lower thin-film coil 11 has three turn parts 11b, 11d, 11f. The turn parts 11b, 11d, 11f are arranged between the later-described substrate side shield part 42 and the first rear shield part 44. The lower thin-film coil 11 has a structure which the turn parts 11b, 11d, 11f align with each other while interposing a photoresist layer 15 therebetween. The turn part 11b is arranged at a closest position to the ABS 30 of the turn parts 11b, 11d, 11f. This turn part 11b, a later-described loop part 11a and a part of one loop part 11c corresponds to a closest coil part according to the embodiment of the present invention.

The lower thin-film coil 11 has a loop part 11a extending from a lead part 13A to the turn part 11b, a one-loop part 11c extending from the turn part 11b to the turn part 11d, and a one-loop part 11e extending from the turn part 11d to a turn part 11f, and a half-loop part 11g extending from the turn part 11f to a connecting part 11h.

The lower thin-film coil 11 is constructed as a continuous line from the lead part 13A to the connecting part 11h, so as to be wound as a flat spiral about the shield magnetic layer 40, thus forming a three-turn loop as a whole. For convenience of illustration, FIG. 1 illustrates only the turn parts 11b, 11d, 11f and connecting part 11h in the lower thin-film coil 11. Each of the turn parts 11b, 11d, 11f has a longitudinally long structure in which the thickness (height in a direction (upper and lower direction) along with the ABS 30) greater than the lateral width. Note that the lateral width means width in a direction (intersecting direction) intersecting the ABS 30, in this embodiment.

The lower thin-film coil 11 forms a following continuous 3-turn loop. Namely, the lead part 13A is connected to the connecting part 11h through the loop part 11a, the one-loop part 11c, one-loop part 11e and the half-loop part 11g, whereby the 3-turn loop is formed.

Next, the upper thin-film coil 50 will be explained. The upper thin-film coil 50 has the first coil layer 51 and the second coil layer 52. The second coil layer 52 is overlaid on the first coil layer 51. The upper thin-film coil 50 has a multiple structure of two layers.

The first coil layer 51 has a turn part 51c as illustrated in FIG. 4. The turn part 51c is arranged between a later-described first upper front shield part 61 and first upper rear shield part 65.

The first coil layer 51 has a half-loop part 51d extending from a connecting part 51a connected to the lower thin-film coil 11 to the turn part 51c and a half-loop part 51b extending from the turn part 51c to the connecting part 51e. The first coil layer 51 is constructed as a continuous line from the connecting part 51a to the connecting part 51e, so as to be wound as a flat spiral about the write shield layer 60, thus forming a one-turn loop as a whole.

Further, the second coil layer 52 has a turn part 52c as illustrated in FIG. 5. The turn part 52c is arranged between a later-described second upper front shield part 62 and second upper rear shield part 64.

The second coil layer 52 has a half-loop part 52d extending from a connecting part 52e connected to the first coil layer 51 to the turn part 52c and a half-loop part 52b extending from the turn part 52c to the connecting part 52a. The second coil layer 52 is constructed as a continuous line from the connecting part 52e to the connecting part 52a, so as to be wound as a flat spiral about the write shield layer 60, thus forming a one-turn loop as a whole.

In the thin-film magnetic head 300, the connecting part 11h of the lower thin-film coil 11 is connected to the connecting part 51a of the upper thin-film coil 50. By this, the lower thin-film coil 11 and the upper thin-film coil 50 form a series of coils. A current corresponding to data to be recorded on a recording medium is flowed through the lower thin-film coil 11 and the upper thin-film coil 50, a recording magnetic field is generated by the current.

Next, the main magnetic pole layer 26 will be explained. The main magnetic pole layer 26 is formed using a magnetic material made of a ferromagnetic body such as NiFe, CoNiFe, CoFe or the like. The ferromagnetic body such as NiFe, CoNiFe, CoFe or the like has a high magnetic permeability. Therefore, a magnetic flux is likely to transmit through the main magnetic pole layer 26, much more magnetic flux transmit through the main magnetic pole layer 26. For this reason, more strong magnetic flux corresponding to the recording magnetic field is emitted from the main magnetic pole layer 26 to the ABS 30.

The main magnetic pole layer 26 has a magnetic pole end face 26a on the ABS 30 side, as illustrated in FIG. 2, FIG. 6. The magnetic pole end face 26a has a bevel form which is wider on the upper thin-film coil 50 side than on the lower thin-film coil 11 side and gradually decreases its width toward the lower thin-film coil 11. The width of the magnetic pole end face 26a on the upper thin-film coil 50 side defines the track width. The track width is about 0.06 to 0.12 μm, for example. The magnetic pole end face 26a is positioned on the ABS 30.

The main magnetic pole layer 26 includes a track width determining part having the magnetic pole end face 26a, a wider part and a width extending part. The track width determining part has a fixed width regardless of the distance from the ABS 30. The wider part is arranged at a position distanced more from the ABS 30 than is the track width determining part and has a width greater than that of the track width determining part. The wider part has the same width as that of the track width determining part at the boundary with the track width determining part, gradually increases the width as it is distanced more from the ABS 30. The width extending part has a fixed width greater than the wider part. In this embodiment, a part from the magnetic pole end part 26a until the width begins to increase is defined as the track width determining part.

Further, as illustrated in FIG. 6, in the main magnetic pole layer 26, an upper tilted surface 26c and a lower tilted surface 26e are formed in the track width determining part. Further, an upper flat surface 26b is formed in a part distanced more from the ABS 30 than is the upper tilted surface 26c. A lower flat surface 26f is formed in a part distanced more from the ABS 30 than is the lower tilted surface 26e.

A part sandwiched between the upper tilted surface 26c and the lower tilted surface 26e (a part from the ABS 30 to a broken line, in FIG. 6) is also called variable height structure part 26x, the height in the direction along the ABS 30 increases as it is distanced more from the ABS 30.

The upper tilted surface 26c is formed in an ascending slope like shape distanced more from the substrate 1 as it is distanced more from the ABS 30. The upper tilted surface 26c is connected to the magnetic pole end face 26a and the upper flat surface 26b. Further, nonmagnetic layers 27, 28 are laminated on the upper flat surface 26b.

The lower tilted surface 26e is formed in a descending slope like shape closer to the substrate 1 as it is distanced more from the ABS 30. The lower tilted surface 26e is connected to the magnetic pole end face 26a and the lower flat surface 26f. The lower flat surface 26f is disposed on the nearest position to the substrate 1 in the main magnetic pole layer 26. A part separated from the ABS 30 of the lower flat surface 26f is connected to a later-described second rear shield part 45 (see FIG. 1).

Further, a nonmagnetic thin-film 25 is formed to come into contact with the lower tilted surface 26e and the lower flat surface 26f. A middle insulating layer 23 is formed to come into contact with the nonmagnetic thin-film 25.

The middle insulating layer 23 is arranged between the main magnetic pole layer 26 and the lower thin-film coil 11. The middle insulating layer 23, for the most part, is arranged at a position distanced more from the ABS 30 than is the later-described leading shield part 41. In addition, the middle insulating layer 23 has a wrap-around structure including a portion wrapping around more to the ABS 30 side along the tilted rear end face 41d than is a rising rear end face 41e of the leading shield part 41. The middle insulating layer 23 is in direct contact with the later-described coil insulating layer 22. Further, the middle insulating layer 23 is in contact with the variable height structure part 26x of the main magnetic pole layer 26 through the nonmagnetic thin-film 25.

The length of the track width determining part from the ABS 30 is referred to as neck height. The neck height is about 0.05 to 0.3 μm, for example.

An opposing insulating layer 17 has a front end face 17a as illustrated in FIG. 6. The entire front end face 17a is disposed in the ABS 30. The opposing insulating layer 17 is disposed on the ABS 30 side of a later-described linking shield part 43. Further, a later-described substrate side shield part 42 is connected to an upper end face 17b of the opposing insulating layer 17.

A coil insulating layer 22 is disposed at a position distanced more from the ABS 30 than is the leading shield part 41. The coil insulating layer 22 in direct contact with the shield upper end face 42b of the substrate side shield part 42 and the coil upper end face 11x of the lower thin-film coil 11. The above-described middle insulating layer 23 is formed so as to cover this coil insulating layer 22.

The gap layer 29 is formed along the upper tilted surface 26c of the main magnetic pole layer 26 between the opposing shield part 61, an intervening insulating film 33 and the main magnetic pole layer 26, the nonmagnetic layers 27, 28. The gap layer 29 is formed so as to cover the upper tilted surface 26c and the nonmagnetic layers 27, 28. The gap layer 29 is made of a nonmagnetic insulating material such as alumina ($Al_2O_3$), nonmagnetic conductive material such as Ru, NiCu, Ta.

Subsequently, the shield magnetic layer 40 will be explained. The shield magnetic layer 40 has the leading shield part 41, the substrate side shield part 42, the linking shield part 43, a first rear shield part 44, a second rear shield part 45 and side shield parts 41A, 41A. The shield magnetic layer 40 is formed using a magnetic material made of a ferromagnetic body such as NiFe, CoNiFe, CoFe or the like.

The leading shield part 41 and the substrate side shield part 42 are arranged closer to the ABS 30 than are the lower thin-film coil 11.

The leading shield part 41 has a leading front end face 41a, as illustrated in detail in FIG. 6. The entire leading front end face 41a is disposed in the ABS 30. Further, the leading shield part 41 opposes the main magnetic pole layer 26 through the nonmagnetic thin-film 25, at the lower tilted surface 26e of the main magnetic pole layer 26 (namely, substrate 1 side of the main magnetic pole layer 26). A depth d2 (space between the ABS 30 and a rising rear end face 41e) of the leading shield part 41 along an intersecting direction intersecting the ABS 30 like perpendicular is formed smaller than the depth d42 of the substrate side shield part 42.

The leading shield part 41 has a leading lower end face 41b, a tilted upper end face 41c, a tilted rear end face 41d and the rising rear end face 41e. The leading lower end face 41b is directly in contact with a shield upper end face 42b of the substrate side shield part 42. The coil insulating layer 22 is in contact with the shield upper end face 42b. The shield upper end face 42b has a part which the coil insulating layer 22 does not touch, and the leading lower end face 41b is in contact with the part. The leading lower end face 41b is formed along the intersecting direction.

The tilted upper end face 41c is formed in a descending slope like shape along the lower tilted surface 26e of the main magnetic pole layer 26. Further, a depth d1 of the tilted upper end face 41c along the intersecting direction is smaller than the depth d2 (depth of the leading shield part 41) of the leading lower end face 41b (d1<d2). The tilted rear end face 41d is also formed in a descending slope like shape. The rising rear end face 41e is connected to the tilted rear end face 41d, and it is formed along the ABS 30. The middle insulating layer 23 is directly contact with the tilted rear end face 41d and the rising rear end face 41e.

Further, the leading shield part 41 is formed such that the space between the lower end face 41b and the substrate 1 is the height h1. The height h1 is equal to the space between the above-described coil upper end face 11x and the substrate 1.

The leading lower end face 41b is disposed at a position closest to the substrate 1 in the leading shield part 41. The leading lower end face 41b is in direct contact with the shield upper end face 42b of the substrate side shield part 42. Therefore, no gap is formed between the leading lower end face 41b and the shield upper end face 42b.

Further, the side shield parts 41A, 41A are formed on the tilted upper end face 41c of the leading shield part 41. The side shield parts 41A, 41A are arranged on both sides in the track width direction of the main magnetic pole layer 26 respectively. The side shield parts 41A, 41A also have front end faces arranged in the ABS 30 respectively (see FIG. 2). The side shield parts 41A, 41A and the leading shield part 41 are formed to surround the magnetic pole end face 26a via the nonmagnetic thin-film 25 and arranged near the main magnetic pole layer 26.

The substrate side shield part 42 has the shield front end face 42a, the shield upper end face 42b, the shield lower end face 42c and the shield rear end face 42d. The entire shield front end face 42a is disposed in the ABS 30. The shield front end face 42a is connected to the leading front end face 41a without intervention of other parts.

The shield upper end face 42b is directly in contact with the leading lower end face 41b. Further, the coil insulating layer 22 is in contact with a part of the shield upper end face 42b distanced more from the ABS 30 than is the leading lower end face 41b. The shield lower end face 42c is directly contact with the upper end face 17b most distanced from the substrate 1 in the opposing insulating layer 17, and an upper end face 43b most distanced from the substrate 1 in the linking shield part 43. The shield rear end face 42d is in contact with the turn part 11b, the above-described loop part 11a and the one-loop part 11c intervening the intervening insulating layer 19 (however, only the turn part 11b is illustrated in FIG. 6).

Further, the substrate side shield part 42 is formed such that the space between the shield upper end face 42b and the substrate 1 is the height h1. The height h1 is equal to not only the space between the leading lower end face 41b and the substrate 1, but also the space between the above-described coil upper end face 11x and substrate 1.

As illustrated in FIG. 1, the linking shield part 43 is formed such as to straddle the turn parts 11b, 11d, 11f of the lower thin-film coil 11, and connects the substrate side shield part 42 and the first rear shield part 44 to each other. The linking shield part 43 has a function as a return pole which backs the magnetic flux emitted from the main magnetic pole layer 26 to the main magnetic pole layer 26.

The linking shield part 43 is disposed at a position distanced from the ABS 30. A front end face 43a of the linking shield part 43 is not disposed at the ABS 30. The front end face 43a is in contact with the opposing insulating layer 17.

The first and second rear shield parts 44,45 are arranged farther from the ABS 30 than are the turn parts 11b, 11d, 11f of the lower thin-film coil 11. Further, the second rear shield part 45 overlies the first rear shield part 44. The first and second rear shield parts 44, 45 form a two-stage structure in which their respective front side faces closer to the ABS 30 are equidistant from the ABS 30. The first and second shield parts 44, 45 have a function as a linking part which links the linking part 43 to the main magnetic pole layer 26.

Next, the write shield layer 60 will be explained. The write shield layer 60 has an opposing shield part 61, an upper front shield part 62, a linking shield part 63, an upper rear shield part 64 and a lower rear shield part 65.

The opposing shield part 61 has a write shield end face 61a disposed in the ABS 30. The opposing shield part 61 opposes the leading shield part 41 within the ABS 30. Besides, a very small space which the gap layer 29 is arranged is formed in the write shield end face 61a of the opposing shield part 61. A part of ABS 30 side of the gap layer 29 is formed in the very small space. The opposing shield part 61 is formed such as to oppose the main magnetic pole layer 26, nonmagnetic layer 27, and nonmagnetic layer 28 sequentially from the ABS 30 side through the gap layer 29.

Further, the opposing shield part 61 has a flat upper end face 61b, to which the upper front shield part 62 is connected. The opposing shield part 61 is disposed at ABS 30 side of the first coil layer 51 in the upper thin-film coil 50.

Further, a tilted surface 61c, which connects the write shield end face 61a with the upper end face 61b is formed. The tilted surface 61c is arranged distanced from the ABS 30. A protective insulating layer 90 is in contact with the tilted surface 61c.

The upper front shield part 62 is arranged closer to the ABS 30 than the second coil layer 52 of the upper thin-film coil 50. The upper front shield part 62 is connected to the opposing shield part 61. A protective insulating layer 90 is in contact with a front end face 62c, which is the ABS 30 side of the upper front shield part 62.

Further, the linking shield part 63 is formed such as to straddle the turn part 51c, turn part 52c of the upper thin-film coil 50. The linking shield part 63 is formed at a position separated from the ABS 30. The linking shield part 63 is connected to the upper front shield part 62 and the upper rear shield part 64.

The upper rear shield part 64 is arranged at a position distanced more from the ABS 30 than is the turn part 52c of the upper thin-film coil 50. The upper rear shield part 64 is connected to the linking shield part 63 and the lower rear shield part 65. A height of the upper rear shield part 64 is equal to a height of the upper front shield part 62. The upper end face of the upper rear shield part 64 forms a common flat surface together with the upper end faces of the second coil layer 52 and the upper front shield part 62.

The lower rear shield part 65 is connected to a rear side of the upper flat surface 26b of the main magnetic pole layer 26 distanced more from the ABS 30 than is the nonmagnetic layers 27, 28. An upper end face of the lower rear shield part 65 is formed without level difference to the upper end face 61b of the opposing shield part 61. The upper end face of the lower rear shield part 65 forms a common flat surface together with the upper end face 61b of the opposing shield part 61.

Further, the thin-film magnetic head 300 has a protective insulating layer 90. The protective insulating layer 90 is formed using an insulating material such as alumina ($Al_2O_3$). The protective insulating layer 90 has an embedded part 90a and a cover part 90b. The embedded part 90a and the cover part 90b are formed in one body. The embedded part 90a comes in contact with an all of the tilted surface 61c, and is embedded with no space between the tilted surface 61c and the ABS 30. The cover part 90b is formed so as to cover the linking shield part 63.

(Method of Manufacturing Thin-Film Magnetic Head)

A method of manufacturing the thin-film magnetic head 300 having the structure mentioned above will now be explained with reference to FIG. 7(a), FIG. 7(b) to FIG. 24(a), FIG. 24(b) together with FIG. 1, FIG. 2, FIG. 6 mentioned above.

FIG. 7(a) to FIG. 24(a) is sectional view corresponding to FIG. 1 in respective step of manufacturing the thin-film magnetic head 300, while FIG. 7(b) to FIG. 24(b) is front view similarly corresponding to FIG. 2.

First, the substrate 1 made of a ceramic material such as aluminum oxide-titanium carbide ($Al_2O_3$.TiC) is prepared. Subsequently, as illustrated in FIG. 7(a), FIG. 7(b), the insulating layer 2 made of an insulating material such as alumina ($Al_2O_3$) and the lower shield layer 3 made of a magnetic material are successively formed on the substrate 1. The heating part 8 is formed when the insulating layer 2 is formed.

Then, the shield gap film 4 is formed by an insulating material such as to shield the MR device 5. Here, an undepicted lead connected to the MR device 5 is formed, and the MR device 5 and the lead are covered with the shield gap film 4. Thereafter, using a magnetic material and an insulating material, the upper shield layer 6 (the first shield part 6a, the insulating part 6b, the second shield part 6c) is formed on the shield gap film 4.

Next, the insulating layer 7 for separating the upper shield layer 6 and a recording head to be formed later from each other is formed by an insulating material such as alumina ($Al_2O_3$). The heat sensing part 9 is formed when the insulating layer 7 is formed. The foregoing steps yield a multilayer body for forming the recording head.

After that, a linking shield part forming step is performed. In this step, a magnetic layer to form the linking shield part 43 is formed using a magnetic material such as NiFe or CoNiFe or the like. This magnetic layer is disposed a position distanced from the ABS 30. Then, an insulating layer is formed on the surface of the multilayer body, and the surface of the multilayer body is flattened by CMP. This forms the opposing insulating layer 17 and the linking shield part 43. Here, the linking shield part 43 is formed such as to be separated from the ABS 30 by 0.3 to 1 μm (about 0.5 μm in this embodiment).

Subsequently, an insulating layer 18 (having a thickness of about 0.1 to 0.3 μm) made of alumina ($Al_2O_3$) is formed on the whole surface of the multilayer body. Then, after applying a photoresist to the whole surface of the multilayer body, patterning is performed with a predetermined photomask, so as to form a resist pattern (not depicted). Using this resist pattern as a mask, etching such as RIE is performed, so as to selectively perforate the insulating layer 18.

Then, a first magnetic layer forming step is performed. In this step, as illustrated in FIG. 7(a), FIG. 7(b), the substrate side shield part 42 and the first rear shield part 44 is formed. The substrate side shield part 42 and the first rear shield part 44 are formed by a thickness of about 1.4-2.0 μm, using a magnetic material made of a ferromagnetic body such as NiFe or CoNiFe or the like, by frame plating method. Both of them are formed so as to be directly connected to the linking shield part 43. The substrate side shield part 42 is formed so as to be arranged in the ABS 30. Further, the substrate side shield part 42 is formed so as to be connected to the opposing insulating layer 17. The first rear shield part 44 is formed at a position distanced from the substrate side shield part 42.

Next, as illustrated in FIG. 8(a), FIG. 8(b), an insulating layer 19A (having a thickness of about 0.02 μm to 0.3 μm, preferably about 0.1 μm to 0.2 μm) made of alumina ($Al_2O_3$) is formed on the whole surface of the multilayer body by CVD (Chemical Vapor Deposition) according to an atomic layer method. The insulating layer 19A is formed so as to cover the substrate side shield part 42 and the first rear shield part 44. This insulating layer 19A becomes the intervening insulating layer 19 lately.

Then, a conductor layer 70 is formed by performing a conductor layer forming step. The conductor layer 70 is formed to form the lower thin-film coil 11. In this step, a conductor layer 70 is formed by frame plating method. The conductor layer 70 is formed between the substrate side shield part 42 disposed in the ABS 30 and the first rear shield part 44. The conductor layer 70 is formed such as to have two interstices 70a between the substrate side shield part 42 and the first rear shield part 44 and come into contact with the substrate side shield part 42 and the first rear shield part 44 through the insulating layer 19A without gaps. The conductor layer 70 is an intermittent conductor layer, since it is provided with interstices 70a.

Next, as illustrated in FIG. 9(a), FIG. 9(b), a photoresist layer 80 (having a thickness of about 1.5 μm to 2.5 μm) is formed so as to be embedded the two interstices 70a in the conductor layer 70. Next, an insulating film 20 adapted to cover the surface of the multilayer body is formed using alumina ($Al_2O_3$) by a thickness of about 3 μm to 4 μm.

Subsequently, a first common flat surface forming step is performed. In this step, planarization the surface of the multilayer body is performed to form a first common flat surface 58. In this case, the surface of the multilayer body is polished by CMP until the substrate side shield part 42 and the first rear shield part 44 emerge, so as to become flat.

The first common flat surface 58 includes the above-described coil upper end face 11x. Further, the first common flat surface 58 includes the surface of the substrate side shield part 42 and the surface of the first rear shield part 44. The surface of the substrate side shield part 42 is the shield upper end face 42b. Furthermore, the thin-film coil 11 is also formed by performing the first common flat surface forming step.

Then, a coil insulating layer forming step is performed. In this step, as illustrated in FIG. 11(a), FIG. 11(b), first, an insulating layer 22A is formed on the first common flat surface 58, using an insulating material such as alumina ($Al_2O_3$). After that, patterning with a predetermined photomask is performed, so as to form an undepicted resist pattern. Using this resist pattern as a mask, etching such as RIE is performed for example, so as to selectively perforate the insulating layer 22A, and it makes the first common flat surface 58 expose. The rest of the insulating layer 22A becomes the coil insulating layer 22. The coil insulating layer 22 is in contact with the shield upper end face 42b and the coil upper end face 11x.

Subsequently, a second magnetic layer forming step is performed after the coil insulating layer forming step is performed. In this step, a leading magnetic layer 41B and the second rear shield part 45 are formed respectively at the perforated part of the insulating layer 22A in a thickness of 0.5 µm to 1.0 µm. The leading magnetic layer 41B is a magnetic layer for forming the leading shield layer 41. The depth of the leading magnetic layer 41B along the intersecting direction is smaller than that of the substrate side shield part 42. These magnetic layers are formed using a magnetic material made of a ferromagnetic body such as NiFe or CoNiFe or the like, by frame plating method.

Next, a tilted rear end face forming step is performed. In this step, etching is performed so as to remove a part 41P of a rear end face in the leading magnetic layer 41B separated from the ABS 30. In this way, the above-described the tilted rear end face 41d is formed in the leading magnetic layer 41B.

Subsequently, a second common flat surface forming step is performed. In this step, planarization the surface of the multilayer body is performed so as to form a second common flat surface 59, as illustrated in FIG. 12(a), FIG. 12(b).

In this case, first, an insulating layer is formed on the surface of the multilayer body using an insulating material such as alumina ($Al_2O_3$). After that, the surface of the multilayer body is polished by CMP until the surfaces of the leading magnetic layer 41B and the second rear shield part 45 emerge, so as to become flat.

After that, leading shield part forming step is performed. In this step, for example, reactive ion etching (hereinafter, referred also to as "RIE") is performed, so as to taper etch the second common flat surface 59 according to a form of the main magnetic pole layer 26. At the time, the second common flat surface 59 is etched so as to form a descending slope. The descending slope is slanted so that height in direction along the ABS 30 can be small as it is distanced more from the ABS 30. The leading shield part 41 and middle insulating layer 23 are formed by performing this step.

Then, a main magnetic pole layer forming step is performed. In this case, as shown in illustrated in FIG. 14(a), FIG. 14(b), the nonmagnetic thin-film 25 is formed on the surfaces of the leading shield part 41 and middle insulating layer 23. The nonmagnetic thin-film 25 is formed by sputtering with a nonmagnetic metal material such as Ru, NiCr, or NiCu, or an insulating material such as alumina.

After that, a magnetic layer 75 is formed on the whole surface of the multilayer body, as illustrated in FIG. 15(a), FIG. 15(b). This magnetic layer 75 is formed by sputtering with a magnetic material made of a ferromagnetic body such as CoNiFe, CoFe, NiFe by thickness of about 0.4 to 0.8 µm. The main magnetic pole layer 26 is formed later by this magnetic layer 75. Then, after an insulating layer is formed on the whole surface of the multilayer body, the whole surface of the multilayer body is polished by CMP, so as to become flat.

After that, a nonmagnetic layer 77 (having a thickness of about 0.04 to 0.1 µm) is formed on the whole surface of the multilayer body by sputtering with a metal material such as Ru, NiCr, or NiCu. The nonmagnetic layer 77 will partly be etched away later, so as to become the above-mentioned nonmagnetic layer 27. Further, using an inorganic insulating material such as alumina ($Al_2O_3$) or silicon oxide, a nonmagnetic layer 78 (having a thickness of about 0.1 to 0.3 µm) is formed on the whole surface of the multilayer body. The nonmagnetic layer 78 will partly be etched away later, so as to become the above-mentioned nonmagnetic layer 28.

Subsequently, after applying a photoresist to the whole surface of the multilayer body, patterning with a predetermined photomask is performed, so as to form a resist pattern 81.

Next, as illustrated in FIG. 17(a), FIG. 17(b), using the resist pattern 81 as a mask, ion beam etching (hereinafter, referred also to as "IBE") or the like, for example, is performed. Parts of the ABS 30 side of the nonmagnetic layer 77, nonmagnetic layer 78 and magnetic layer 75 are removed so as to expose respective upper surfaces separated from the substrate 1, by performing this etching. In this way, the main magnetic pole layer 26 is formed.

After that, the resist pattern 81 is removed. Then, the gap layer 29 (having a thickness of about 250 Å to 350 Å) is formed on the whole surface of the multilayer body by sputtering or CVD with an insulating material such as alumina ($Al_2O_3$) or a nonmagnetic conductive material such as Ru, NiCu, or Ta.

Next, an undepicted photoresist is applied to the whole surface of the multilayer body. Then, patterning with a predetermined photomask is performed, so as to form an undepicted resist pattern. Using this resist pattern as a mask, etching such as IBE is performed, and parts of the gap layer 29, the nonmagnetic layer 77 and nonmagnetic layer 78 are removed, as illustrated in FIG. 18(a), 18(b). Here, the gap layer 29, nonmagnetic layer 77 and nonmagnetic layer 78 are partly removed, so as to secure a space for forming the lower rear shield part 65. The remaining parts of the nonmagnetic layer 77 and nonmagnetic layer 78 become the above-described the nonmagnetic layers 27, 28.

Subsequently, as illustrated in FIG. 19(a), 19(b), a magnetic layer 61A and the lower rear shield part 65 are formed by performing a first shield part forming step. In this step, the magnetic layer 61A and the lower rear shield part 65 are formed by plating method using a magnetic material made of a ferromagnetic body such as CoNiFe, CoFe, CoFeN, NiFe or the like by a thickness of about 0.5 to 1.2 µm. The magnetic layer 61A will later form the opposing shield part 61. The magnetic layer 61A is formed on the ABS 30 side of the gap layer 29, and the lower rear shield part 65 is formed on the main magnetic pole layer 26.

Subsequently, an insulating layer 33 (having a thickness of about 1 to 3 µm) is formed on the whole surface of the multilayer body using an insulating material such as alumina ($Al_2O_3$), as illustrated in FIG. 20(a), 20(b).

Then, a conductor layer 71 is formed between the magnetic layer 61A and the lower rear shield part 65 in the surface of the multilayer body. This conductor layer 71 will later form the first coil layer 51 of the upper thin-film coil 50. This conductor layer 71 is formed so as to come into contact with the magnetic layer 61A and the lower rear shield part 65 through the insulating film 33 without gaps.

After that, a cover insulating film 35 adapted to cover the surface of the multilayer body is formed using alumina (Al$_2$O$_3$) by a thickness of about 3 µm to 4 µm. Subsequently, the surface of the multilayer body is polished by CMP until the surfaces of the magnetic layer 61A and the lower rear shield part 65 emerge, so as to become flat.

Figure 22:
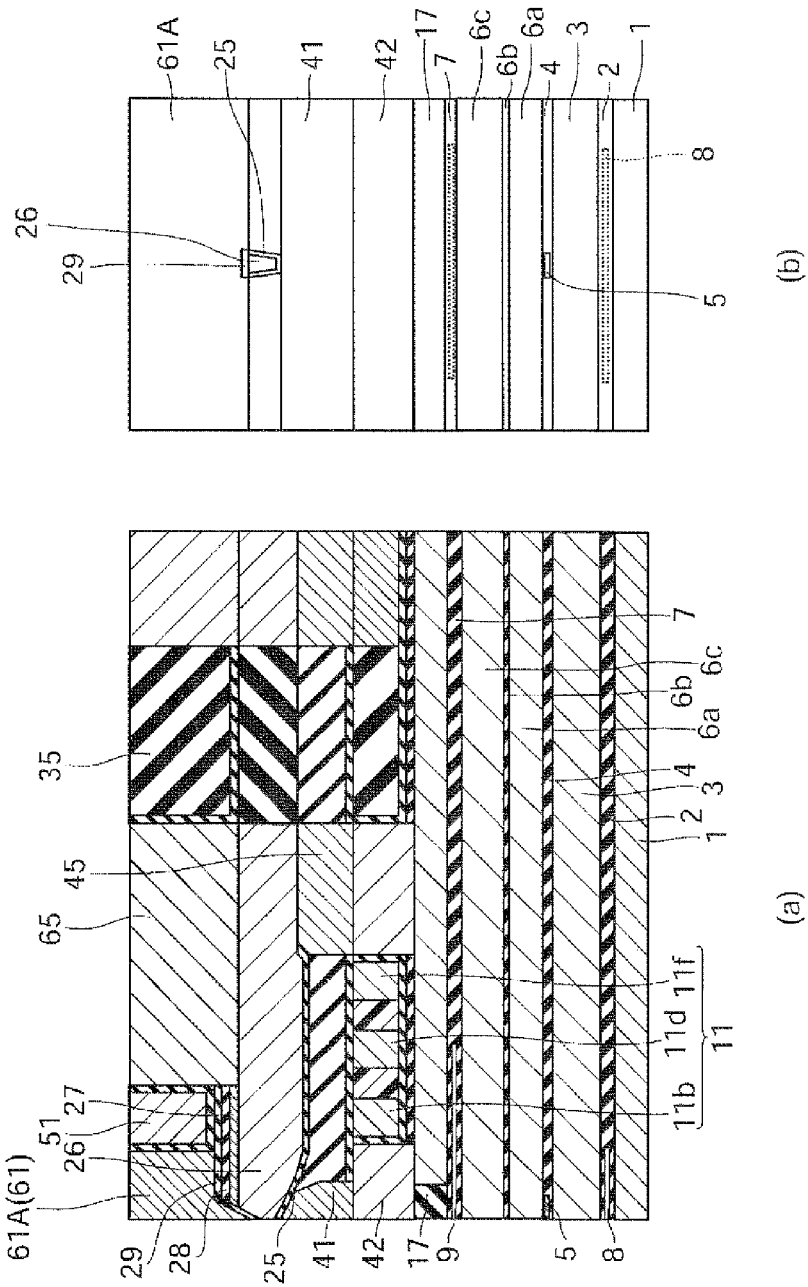
FIG. 22 illustrates a step subsequent to that of FIG. 21, in which (a) is a sectional view corresponding to FIG. 1, in which (b) is a front view corresponding to FIG. 2.

This forms the first coil layer 51 of the upper thin-film coil 50, as illustrated in FIG. 22(*a*), FIG. 22(*b*). In this event, flattening of the surface of the multilayer body is performed so that the thickness of the upper thin-film coil 50 is about 1.0 µm to 1.8 µm.

Figure 23:
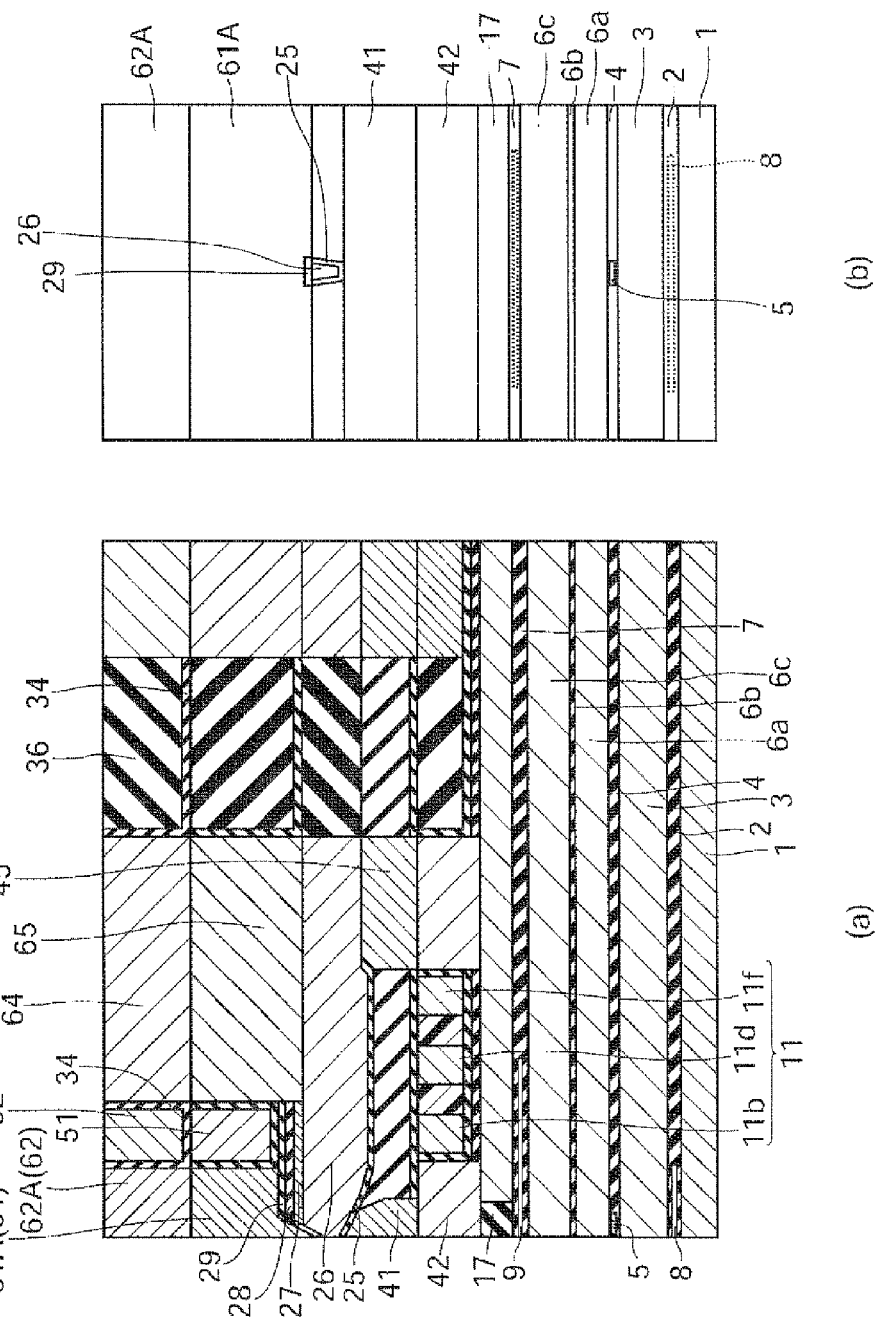
FIG. 23 illustrates a step subsequent to that of FIG. 22, in which (a) is a sectional view corresponding to FIG. 1, in which (b) is a front view corresponding to FIG. 2.

Subsequently, as illustrated in FIG. 23(*a*), 23(*b*), a magnetic layer 62A and the upper rear shield part 64 are formed by performing a second shield part forming step. In this step, the magnetic layer 62A and the upper rear shield part 64 are formed by plating method using a magnetic material made of a ferromagnetic body such as CoNiFe, CoFe, CoFeN, NiFe or the like by a thickness of about 0.5 to 1.2 µm. The magnetic layer 62A will later form the upper front shield part 62. The magnetic layer 62A is formed on the magnetic layer 61A of the ABS 30 side, and the upper rear shield part 64 is formed on the lower rear shield part 65.

Subsequently, an insulating layer 34 (having a thickness of about 1 to 3 µm) is formed on the whole surface of the multilayer body using an insulating material such as alumina (Al$_2$O$_3$).

Then, a conductor layer is formed between the magnetic layer 62A and the upper rear shield part 64 in the surface of the multilayer body. This conductor layer will later form the second coil layer 52 of the upper thin-film coil 50. This conductor layer 72 is formed so as to come into contact with the magnetic layer 62A and the upper rear shield part 64 through the insulating film 34 without gaps.

After that, a cover insulating film 36 adapted to cover the surface of the multilayer body is formed using alumina (Al$_2$O$_3$) by a thickness of about 3 µm to 4 µm. Subsequently, the surface of the multilayer body is polished by CMP until the surfaces of the magnetic layer 62A and the upper rear shield part 64 emerge, so as to become flat. This forms the second coil layer 52 of the upper thin-film coil 50. In this event, flattening of the surface of the multilayer body is performed so that the thickness of the upper thin-film coil 50 is about 1.0 µm to 1.8 µm.

Figure 24:
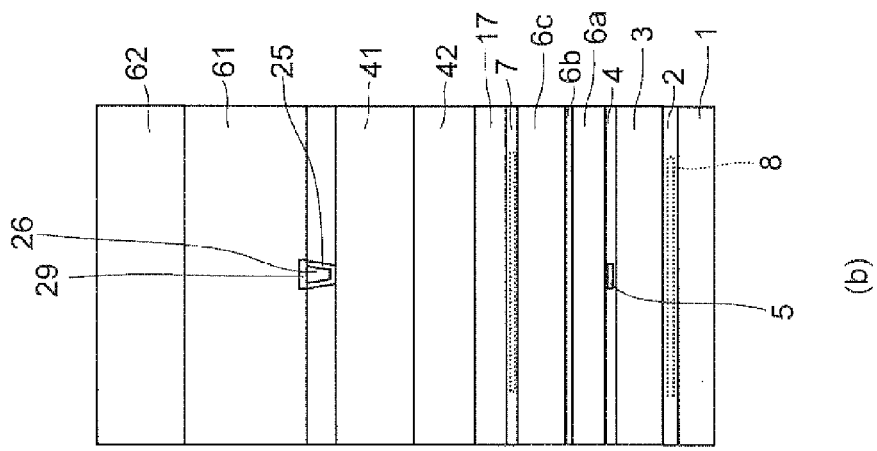
FIG. 24 illustrates a step subsequent to that of FIG. 23, in which (a) is a sectional view corresponding to FIG. 1, in which (b) is a front view corresponding to FIG. 2.
Figure 24:
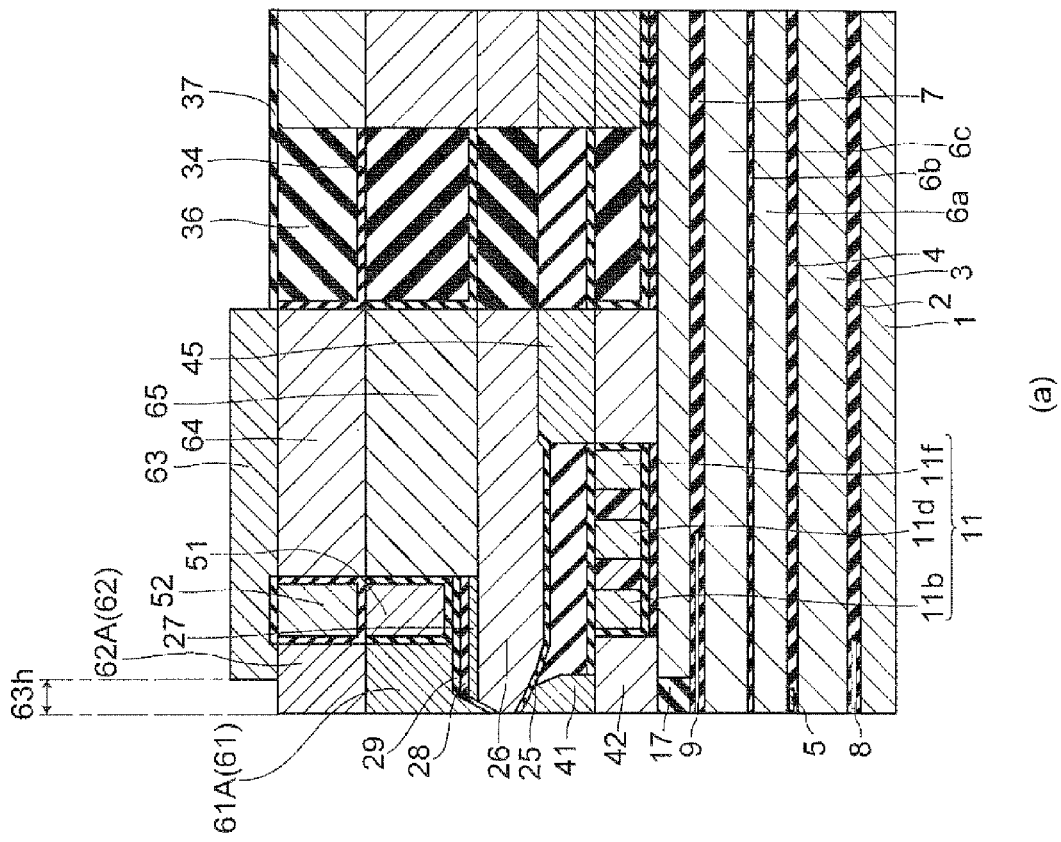

Next, an insulating layer 37 formed of alumina (Al$_2$O$_3$) is formed on the whole surface of the multilayer body, as illustrated in FIG. 24(*a*), 24(*b*). Then, after applying a photoresist to the whole surface of the multilayer body, patterning with a predetermined photomask is performed, so as to form a resist pattern (not shown). Using the resist pattern as a mask, etching such as RIE, for example, is performed, so as to selectively perforate the insulating layer 37. The insulating layer 37 is perforated so as to expose the surface of the magnetic layer 62A and the surface of the upper rear shield part 64.

After that, the linking shield part 63 is formed. The linking shield part 63 is formed at a position separated from the ABS 30 by making it recede from the ABS 30. In other words, the linking shield part 63 is formed at a position where a receding space 63*h* is secured between the linking shield part 63 and the ABS 30. The receding space 63*h* becomes an elongated part having a width, for example, about 0.4 µm to 0.7 µm along the ABS 30 and the same height as that of the linking shield part 63.

Next, a trimming step is performed. In this step, IBE is performed by applying ion beams from the upper direction using the linking shield part 63 as a mask to cut off the part of the magnetic layer 61A, 62A which is not covered with the linking shield part 63. Since the part of the magnetic layer 62A on the ABS 30 side is not covered with the linking shield part 63, the part on the ABS 30 side of the magnetic layer 62A is cut off by performing IBE.

Though the linking shield part 63 itself is used as a mask in the above-described trimming step, a mask such as a photoresist or the like covering the upper face of the linking shield part 63 may be used instead of using the linking shield part 63. More specifically, a mask equal in size to the linking shield part 63 may be formed on the upper face of the linking shield part 63 using photoresist or the like, and the part of the magnetic layer 62A which is not covered with the linking shield part 63 may be cut off using the mask.

Further, with chemical action of gas plasma used in etching, the etching can proceed not only in the vertical direction (the longitudinal direction in FIG. 24) but also in the horizontal direction (the lateral direction in FIG. 24) of the magnetic layer 62A. Therefore, it is preferable to perform non-active IBE, namely, ion milling in the trimming step. Etching performed utilizing physical impact when inactive ions are applied is also called ion milling for distinction from reactive ion etching.

Subsequently, as illustrated in FIG. 1, the protective insulating layer 90 is formed by an insulating material such as alumina (Al$_2$O$_3$), whereby the thin-film magnetic head 300 is completed.

The protective insulating layer 90 is formed such as to come into contact with an entire the tilted surface 61*c* and be embedded without gap between the front end face 62*c* and the ABS 30.

(Operation and Effect of Thin-Film Magnetic Head 300)

As described above, the thin-film magnetic head 300 has the leading shield part 41, the substrate side shield part 42 and the lower thin-film coil 11. Further, in the thin-film magnetic head 300, the leading shield part 41, the substrate side shield part 42 and the lower thin-film coil 11 are formed as follows.

Namely, the spaces to the substrate 1 about both of the leading lower end face 41*b* of the leading shield part 41 and coil upper end face 11*x* are equal to each other, and both of them are formed so that the space with respect to the substrate 1 is the height h1, as illustrated in FIG. 6. In addition, the leading lower end face 41*b* is directly in contact with the shield upper end face 42*b* of the substrate side shield part 42, and the substrate side shield part 42 is formed so that the space of the shield upper end face 42*b* with respect to the substrate 1 is also the height h1. Therefore, no gap is formed between the leading lower end face 41*b* and the shield upper end face 42*b*, between the leading lower end face 41*b* and the coil upper end face 11*x*.

On the other hand, in the conventional thin-film magnetic head 800, the lower shield layer 730 has the connecting shield part 713 and the front shield part 712, as a magnetic layer which connects the leading shield part 711 with the linking shield part 714. Therefore, when manufacturing the conventional thin-film magnetic head 800, both the step of manufacturing the connecting shield part 713 and the step of manufacturing the front shield part 712 need to be performed.

Further, the connecting shield part 713 and the front shield part 712 are subjected to polishing by CMP and thereby manufactured together with the insulating layer 732 and the opposing insulating layer 733 respectively. Therefore, at the time when manufacturing the thin-film magnetic head 800, not only the step of manufacturing magnetic layers for forming the connecting shield part 713 and the front shield part 712 respectively but also the steps of manufacturing insulating layers for forming the insulating layer 732 and the opposing insulating layer 733 respectively need to be performed.

In the conventional thin-film magnetic head 800, both the connecting shield part 713 and the front shield part 712 are indispensable magnetic layers as magnetic layers for connecting the leading shield part 711 and the linking shield part 714.

However, since both the connecting shield part 713 and the front shield part 712 need to be manufactured in addition to the leading shield part 711 and the linking shield part 714 in the conventional thin-film magnetic head 800, it is very difficult to simplify the manufacturing steps.

If the thin-film magnetic head 800 has a structure in which at least one of the connecting shield part 713 and the front shield part 712 is unnecessary, the manufacturing steps of the thin-film magnetic head 800 can be simplified. Regarding this point, the front shield part 712 is adjacent to the lower thin-film coil 718. Therefore, it is desirable to eliminate the need for the connecting shield part 713 and leave the front shield part 712 so as to increase the heights of the front shield part 712 and the lower thin-film coil 718 according to the elimination of the connecting shield part 713.

However, the leading shield part 711 is not connected to the front shield part 712, so that if the connecting shield part 713 is eliminated, the leading shield part 711 is not connected to the linking shield part 714 in that state. In this case, the depth of at least one of the leading shield part 711 and the front shield part 712 needs to be increased.

If the depth of the leading shield part 711 is increased, the size of the magnetic layer arranged near the main magnetic pole layer 710 increases to increase the magnetic flux leaking from the main magnetic pole layer 710 to the leading shield part 711. Then, WATE, ATE become more likely to occur. For this reason, it is desirable not to increase the depth of the leading shield part 711 but make it as small as possible.

Regarding this point, to make the depth of the leading shield part 711 as small as possible and to surely connect the leading shield part 711 to the linking shield part 714, it is desirable to increase the depth of the front shield part 712 to an extent to be exposed in the ABS 706.

However, this causes not only the leading shield part 711 but also the front shield part 712 to be exposed in the ABS 706, so that WATE, ATE may become more likely to occur accordingly to the increased magnetic layers exposed in the ABS 706.

Hence, to avoid the situation that WATE, ATE become more likely to occur accompanying the above-described simplification of the manufacturing steps, the thin-film magnetic head 300 according to the embodiment of the present invention has the leading shield part 41, the substrate side shield part 42, the main magnetic pole layer 26 and the middle insulating layer 23 having the above-described structure.

Since the leading shield part 41 and the linking shield part 43 are connected to each other only by the substrate side shield part 42 in the thin-film magnetic head 300 as described above, the manufacturing steps of the magnetic layer and the insulating layer are simplified as compared to those in the conventional thin-film magnetic head 800. Accordingly, the number of thin-film magnetic heads 300 manufactured in a unit time can be increased.

However, since the substrate side shield part 42 is exposed in the ABS 30 in the thin-film magnetic head 300, the leakage of the magnetic flux increases accompanying the exposure, and WATE, ATE may become more likely to occur.

The thin-film magnetic head 300 has, however, the following structures a1, a2, a3 so as to reduce the leakage of the magnetic flux from the main magnetic pole layer 26 to the leading shield part 41, thereby avoiding the situation that WATE, ATE become more likely to occur.

The structure a1 here is a structure in which the depth of the leading shield part 41 is made smaller than the depth of the substrate side shield part 42. Further, the structure a2 is a structure in which the tilted rear end face 41d is formed in the leading shield part 41. The structure a3 is the wrap-around structure of the middle insulating layer 23 entering between the main magnetic pole layer 26 and the tilted rear end face 41d of the leading shield part 41 and wraps around more to the ABS 30 side than is the rising rear end face 41e.

When the thin-film magnetic head 300 has the structure a1, the size of the leading shield part 41 arranged near the main magnetic pole layer 26 becomes smaller, so that the size of the magnetic layer arranged near the main magnetic pole layer 26 becomes smaller. Therefore, it is possible to reduce the leakage of the magnetic flux from the main magnetic pole layer 26 to the leading shield part 41.

Further, when the thin-film magnetic head 300 has the structure a2, the depth of the leading shield part 41 becomes smaller as it comes closer to the main magnetic pole layer 26, so that the size of the magnetic layer arranged near the main magnetic pole layer 26 becomes much smaller. Therefore, it is possible to further reduce the leakage of the magnetic flux from the main magnetic pole layer 26 to the leading shield part 41.

Further, when the thin-film magnetic head 300 has the structure a3, the middle insulating layer 23 enters between the main magnetic pole layer 26 and the tilted rear end face 41d of the leading shield part 41. Since the middle insulating layer 23 is formed using a nonmagnetic insulating material such as alumina ($Al_2O_3$), the magnetic flux becomes less likely to flow from the main magnetic pole layer 26 to the leading shield part 41 through the middle insulating layer 23. Therefore, it is possible to further reduce the leakage of the magnetic flux from the main magnetic pole layer 26.

The thin-film magnetic head 300 has the structures a1, a2, a3 as described above and thus avoids the situation that WATE, ATE become more likely to occur accompanying the simplification of the manufacturing steps.

On the other hand, the leading shield part 41 and the linking shield part 43 are connected to each other only by the substrate side shield part 42 in the thin-film magnetic head 300. Therefore, flexibility is generated in the read/write separation accordingly to the reduced number of magnetic layers connecting the leading shield part 41 to the linking shield part 43 in the thin-film magnetic head 300 as compared to the conventional thin-film magnetic head 800, thereby making it easy to keep the read/write separation within a predetermined dimension. Accordingly, it is possible in the thin-film magnetic head 300 to more surely comply with the restriction that the RWS is kept within a certain dimension range.

As described above, it is possible in the thin-film magnetic head 300 to reduce ATE, WATE while complying with the restriction of the RWS, and to simplify the manufacturing steps so as to increase the number of thin-film magnetic heads 300 manufactured in a unit time.

Meanwhile, if flexibility is generated in the read/write separation, it also becomes possible to increase the height of the lower thin-film coil 11. This facilitates flow of the current flowing through the lower thin-film coil 11, so that the resistance value of the lower thin-film coil 11 lowers to be able to reduce the volume of heat generation. If the volume of heat generation in the lower thin-film coil 11 increases, the photoresist layer 15 expands to increase the possibility that the substrate side shield part 42 is exposed in the ABS 30. However, the possibility can be reduced in the thin-film magnetic head 300.

Consequently, the thin-film magnetic head 300 is very unlikely to be damaged by the protrusion of the recording head and thus can approach recording media.

While the thin-film magnetic head 300 is incorporated in an undepicted slider, the flying height of the slider from the recording medium surface is able to be reduced. Therefore, the thin-film magnetic head 300 is able to enhance the resolution of recording and reproducing heads, thereby improving their signal-to-noise ratio. This can also increase the recording density of the thin-film magnetic head 300.

Further, since the leading shield part 41 has the tilted upper end face 41c smaller than the leading lower end face 41b about the depth, and the tilted upper end face 41c is in contact with the main magnetic pole layer 26 through the nonmagnetic thin-film 25, it makes a magnetic layer disposed near the main magnetic pole layer 26 smaller in size. Therefore the leakage of the magnetic flux from the main magnetic pole layer 26 is able to be more reduced.

Furthermore, since the linking shield part 43 is disposed at a position separated from the ABS 30, a magnetic layer disposed in the ABS 30 is smaller in size as compared to the case where the linking shield part 43 is disposed at the ABS 30. Accordingly, ATE and WATE are able to be more reduced.

The length of the magnetic path along the top-down direction is shorter than that of the thin-film magnetic head 800 so that the magnetic path length is able to be reduced in the thin-film magnetic head 300.

Hence, the thin-film magnetic head 300 is able to improve the flux rise time, non-linear transition shift (NLTS) characteristic, overwrite characteristic, and the like of the recording head, and follow rapid changes in recording signals having a high frequency and changing fast. This makes the thin-film magnetic head 300 suitable as a recording head for hard disk drives mounted to servers in particular.

Modified Example 1

Figure 25:
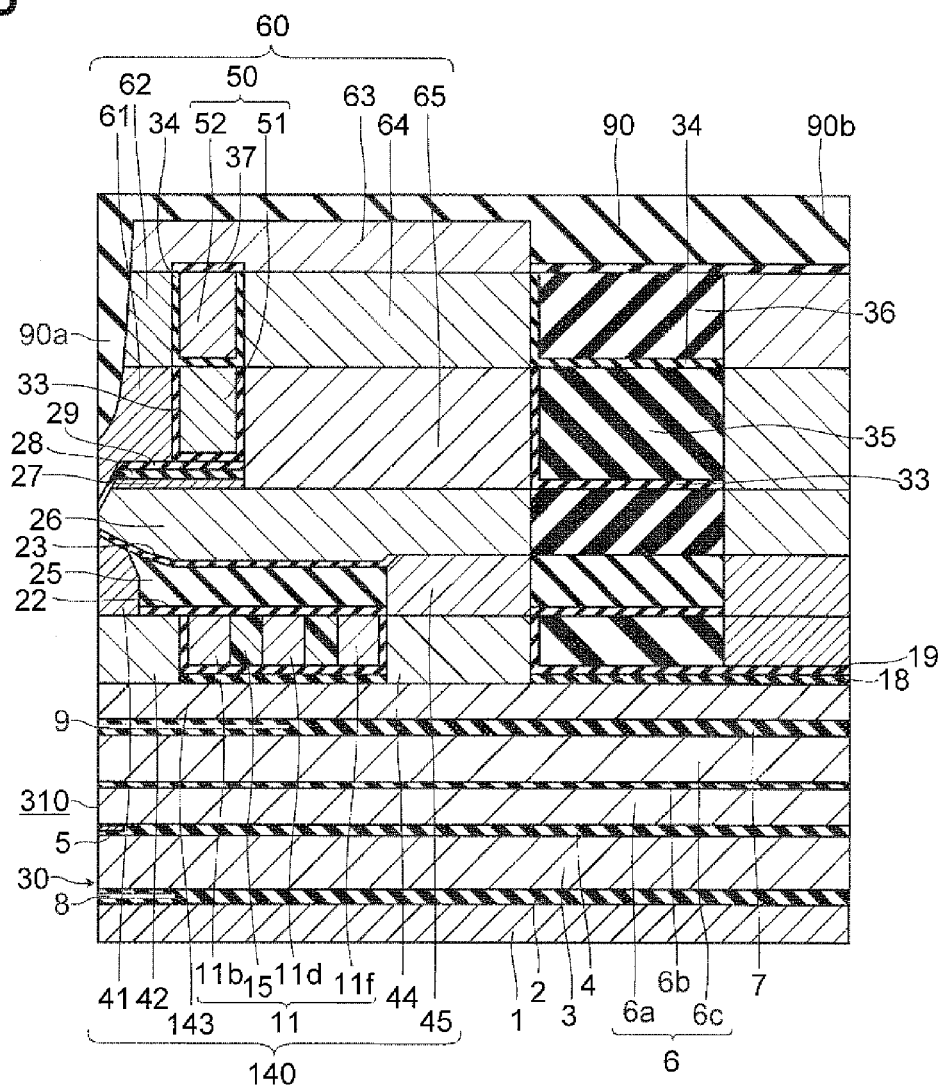
FIG. 25 is a sectional view of the thin-film magnetic head according to a modified example 1 taken along the line 1-1 of FIG. 26, along by a direction intersecting its ABS.
Figure 26:
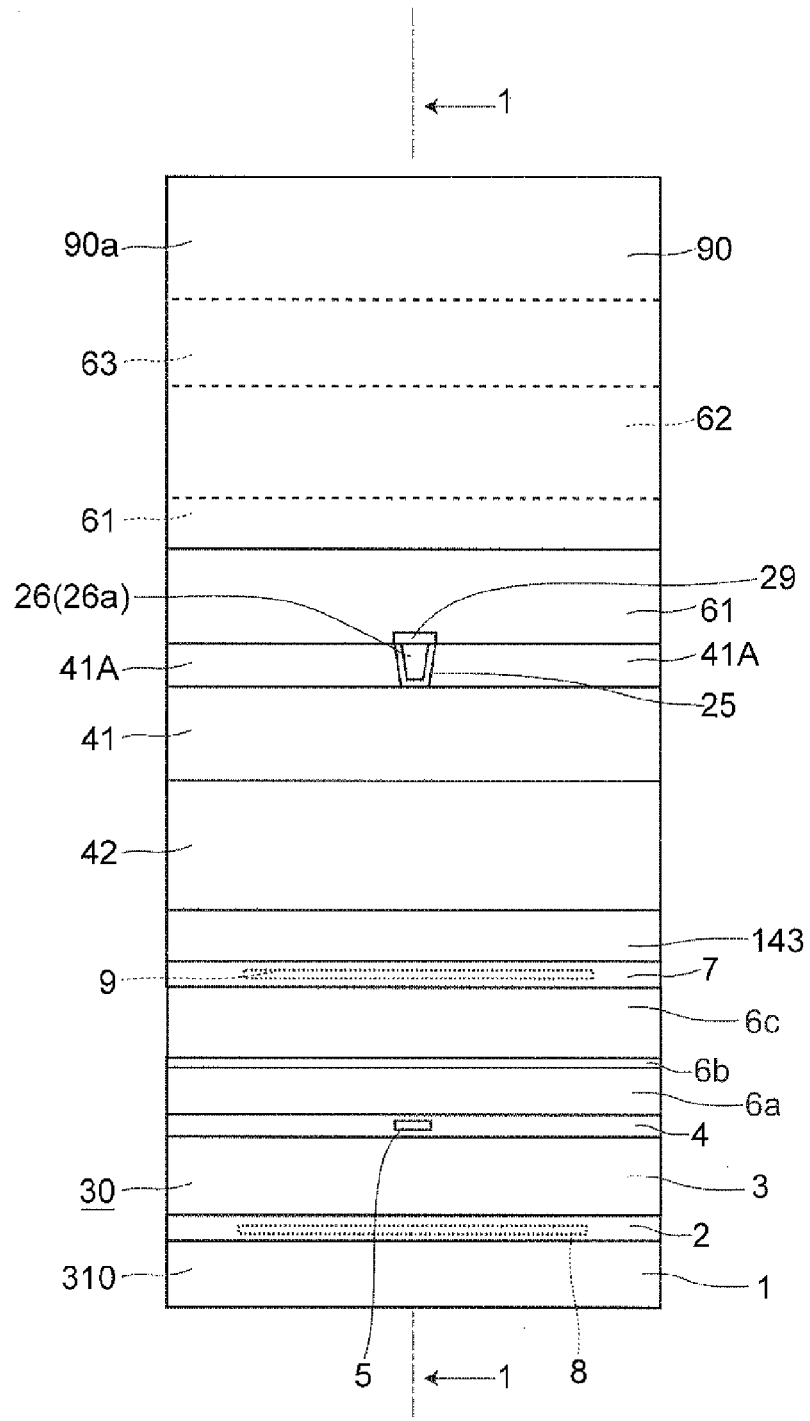
FIG. 26 is a front view illustrating an ABS of the thin-film magnetic head of FIG. 25.

Next, the thin-film magnetic head 310 according to a modified example 1 of the present invention will now be explained with reference to FIG. 25, FIG. 26. FIG. 25 is a sectional view of the thin-film magnetic head 310 according to a modified example 1 taken along the line 1-1 of FIG. 26, along by a direction intersecting its ABS 30. FIG. 26 is a front view illustrating the ABS 30 of the thin-film magnetic head 310.

The thin-film magnetic head 310 is different in that it has a linking shield part 143 in place of the linking shield part 43, and that it does not have the opposing insulating layer 17, as compared with the thin-film magnetic head 300.

The linking shield part 143 is different in that it has an end face disposed in the ABS 30, and that it is exposed in the ABS 30, as compared with the linking shield part 43.

Since the linking shield part 143 is exposed in the ABS 30, a magnetic layer disposed in the ABS 30 is large in size as compared with the thin-film magnetic head 300, in the thin-film magnetic head 310.

However, the thin-film magnetic head 310 has the above-described structures a1, a2, a3 as with the thin-film magnetic head 300. Therefore, it is possible also in the thin-film magnetic head 310 to reduce ATE, WATE while complying with the restriction of the RWS, and to simplify the manufacturing steps so as to increase the number of thin-film magnetic heads 310 manufactured in a unit time.

Modified Example 2

Figure 27:
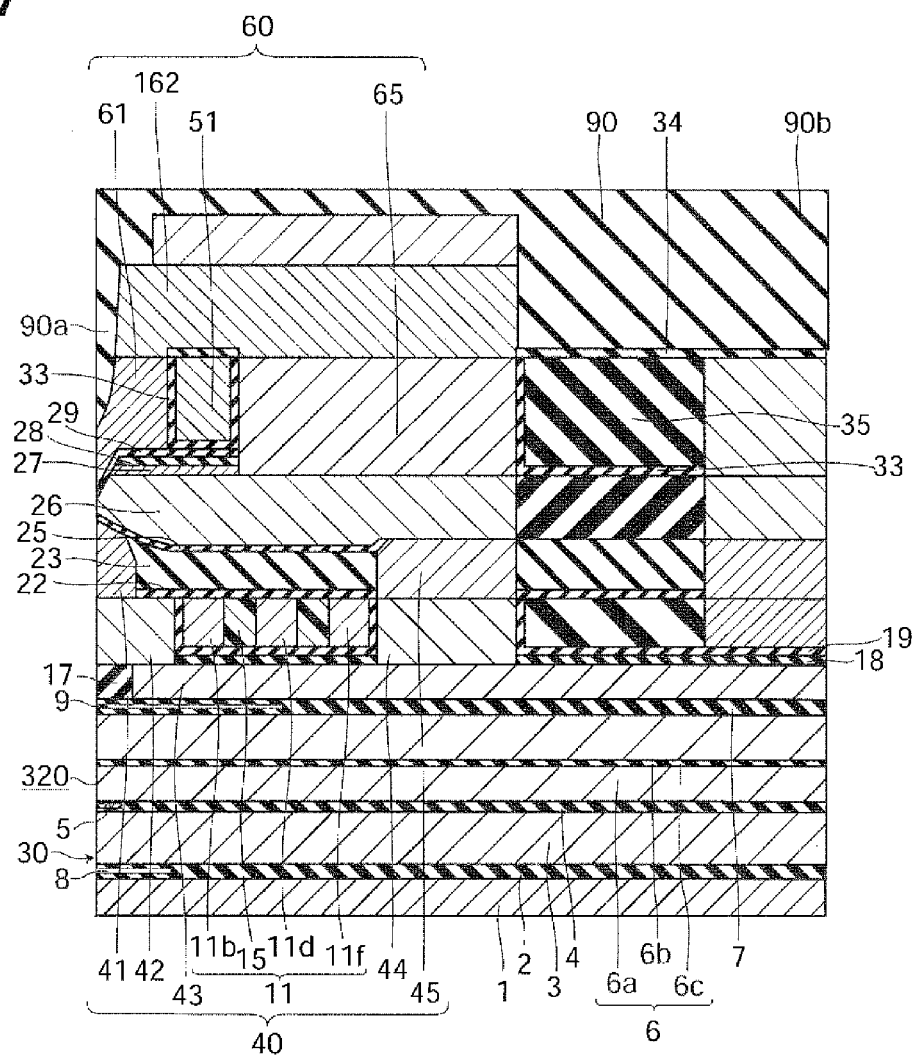
FIG. 27 is a sectional view of the thin-film magnetic head according to a modified example 2, along by a direction intersecting its ABS, similar with FIG. 1.

Next, the thin-film magnetic head 320 according to a modified example 2 of the present invention will now be explained with reference to FIG. 27. FIG. 27 is a sectional view of the thin-film magnetic head 320 according to the modified example 2 of the present invention, along by a direction intersecting its ABS 30, similar with FIG. 1.

The thin-film magnetic head 320 is different in that it has a first coil layer 51 in place of the upper thin-film coil 50, as compared with the thin-film magnetic head 300. Further, the thin-film magnetic head 320 is different in that it has a linking shield part 162 in place of the upper front shield part 62, linking shield part 63 and upper rear shield part 64, as compared with the thin-film magnetic head 300. Further, the thin-film magnetic head 320 is different in that it has a displacement suppression layer 85, as compared with the thin-film magnetic head 300.

The upper thin-film coil 50 has a multiple structure of two layers though, the first coil layer 51 has one layer.

The linking shield part 162 is formed such as to straddle the turn parts 51c of the first coil layer 51. The linking shield part 162 is disposed at a position distanced from the ABS 30. The linking shield part 162 is connected to the opposing shield part 61 and the upper rear shield part 65.

The displacement suppression layer 85 is connected an upper end face of the linking shield part 162. The displacement suppression layer 85 is formed from a nonmagnetic material having a low coefficient of linear thermal expansion. For example, the displacement suppression layer 85 is preferably made of an inorganic material or metal material, examples of which include SiC, AlN, $Si_3N_4$, and W (tungsten). It will be preferred in particular to use a nonmagnetic material having a high hardness for the displacement suppression layer 85. For example, the displacement suppression layer 85 is preferably made of SiC, which has a Vickers hardness higher than that of alumina.

The thin-film magnetic head 320 has also the above-described structures a1, a2, a3. Therefore, it is possible in the thin-film magnetic head 320 to reduce ATE, WATE while complying with the restriction of the RWS, and to simplify the manufacturing steps so as to increase the number of thin-film magnetic heads 320 manufactured in a unit time.

Modified Example 3

Figure 28:
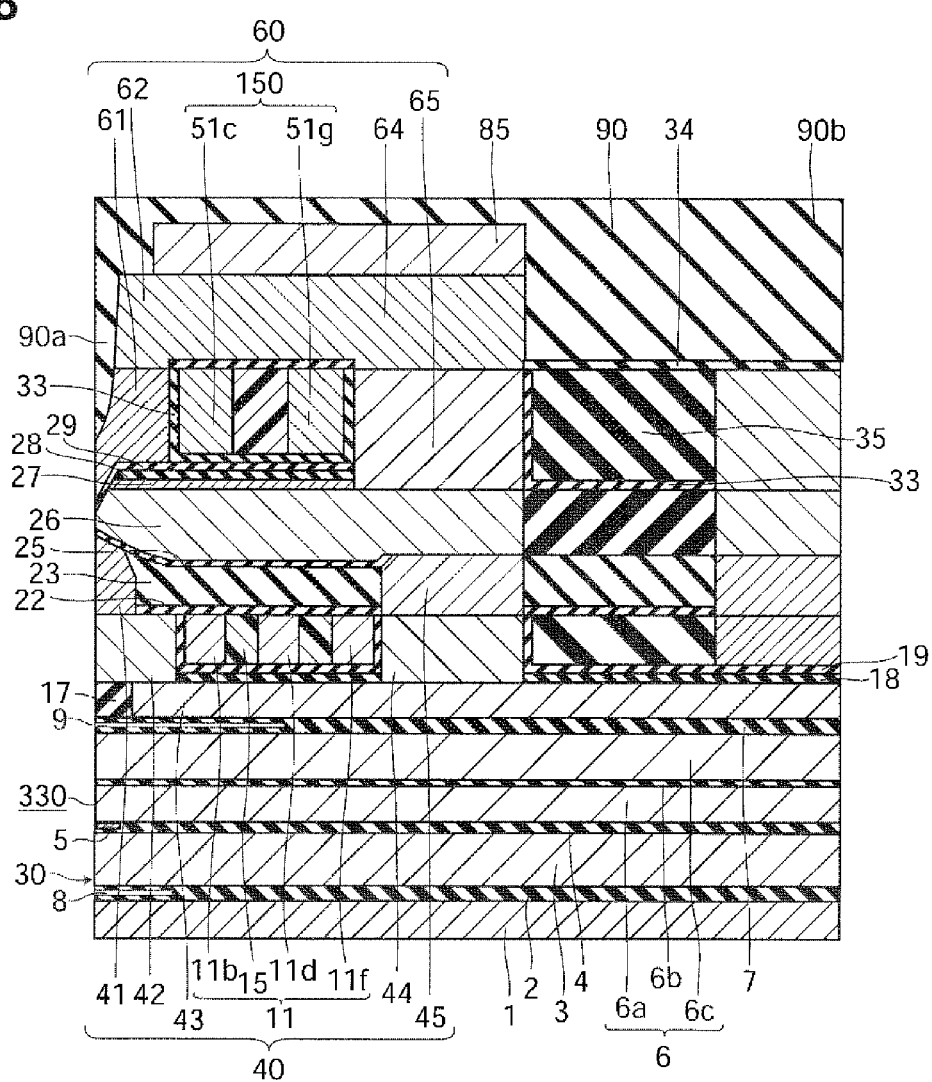
FIG. 28 is a sectional view of the thin-film magnetic head according to a modified example 3, along by a direction intersecting its ABS, similar with FIG. 1.

Next, the thin-film magnetic head 330 according to a modified example 3 of the present invention will be explained with reference to FIG. 28. FIG. 28 is a sectional view of the thin-film magnetic head 330 according to a modified example 3 of the present invention, along by a direction intersecting its ABS 30, similar with FIG. 1.

The thin-film magnetic head 330 is different in that it has an upper thin-film coil 150 in place of the first coil layer 51, as compared with the thin-film magnetic head 320.

The upper thin-film coil 150 has a turn part 51c and turn part 51g, and it forms a two-turn loop as a whole.

The thin-film magnetic head 330 has also the above-described structures a1, a2, a3. Therefore, it is possible in the thin-film magnetic head 330 to reduce ATE, WATE while complying with the restriction of the RWS, and to simplify the manufacturing steps so as to increase the number of thin-film magnetic heads 330 manufactured in a unit time.

Examples

Examples relating to the effect of improving WATE in the above-described thin-film magnetic heads 300, 310 will be described with reference to FIG. 29. The present inventors conducted experiments for confirming the effect of improving WATE for the thin-film magnetic heads 300, 310 respectively.

Figure 29:
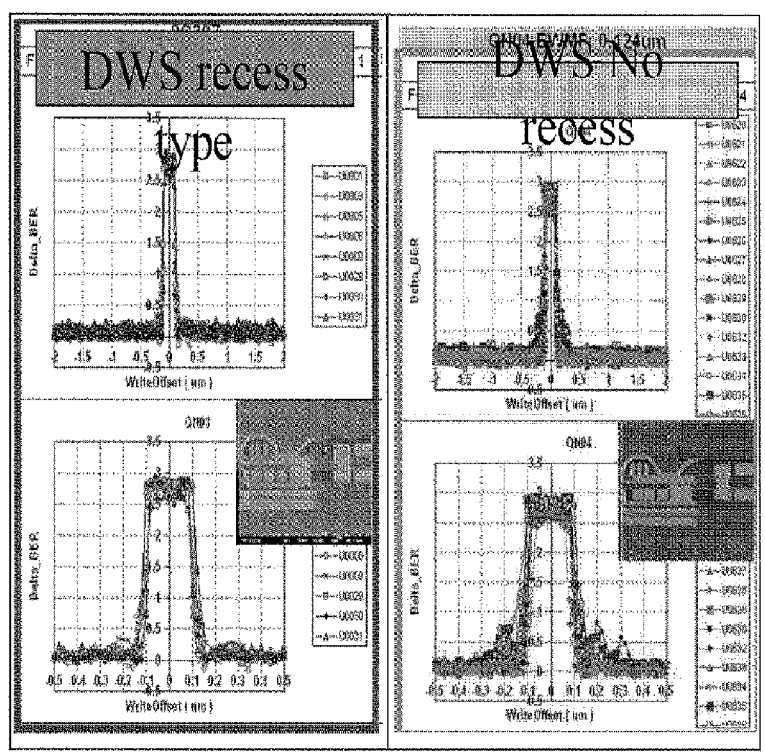
FIG. 29 is a graph illustrating a distribution of bite error rate according to an offset from sector being recording target, in which (a) illustrates the distribution of bite error rate in the thin-film magnetic head 300, in which (b) illustrates the distribution of bite error rate in the thin-film magnetic head 310.

FIG. 29 is a graph illustrating a distribution of bit error rate for each write offset from the sector that is the recording target. The bit error rate indicates the rate of error reproduction when data recorded by each of the thin-film magnetic heads 300, 310 is reproduced by the respective reproducing head.

In FIG. 29, (a), (b) indicates the distribution of the bit error rate in each of the thin-film magnetic heads 300, 310. Further, in each drawing, the graph on the upper section indicates the distribution of the write offset from 0 to 2 μm in increments of 0.5 μm. The graph on the lower section indicates the distribution of the write offset from 0 to 0.5 μm in increments of 0.1 μm.

Comparing the upper sections and the lower sections in FIG. 29(a) and FIG. 29(b), it is found that the frequency of occurrence of the bit error rate in each of the upper section and the lower section in FIG. 29(a) is reduced more than that in FIG. 29(b).

As described above, it is possible both in the thin-film magnetic heads 300, 310 to reduce ATE, WATE while complying with the restriction of the RWS.

It becomes, however, clear from the above embodiments that a higher effect of improving WATE can be obtained by constructing the structure in which the linking shield part 43 is disposed at a position separated from the ABS 30 as in the thin-film magnetic heads 300.

(Embodiments of Head Gimbal Assembly and Hard Disk Drive)

Next, embodiments of the head gimbal assembly and hard disk drive will now be explained with reference to FIG. 30.

Figure 30:
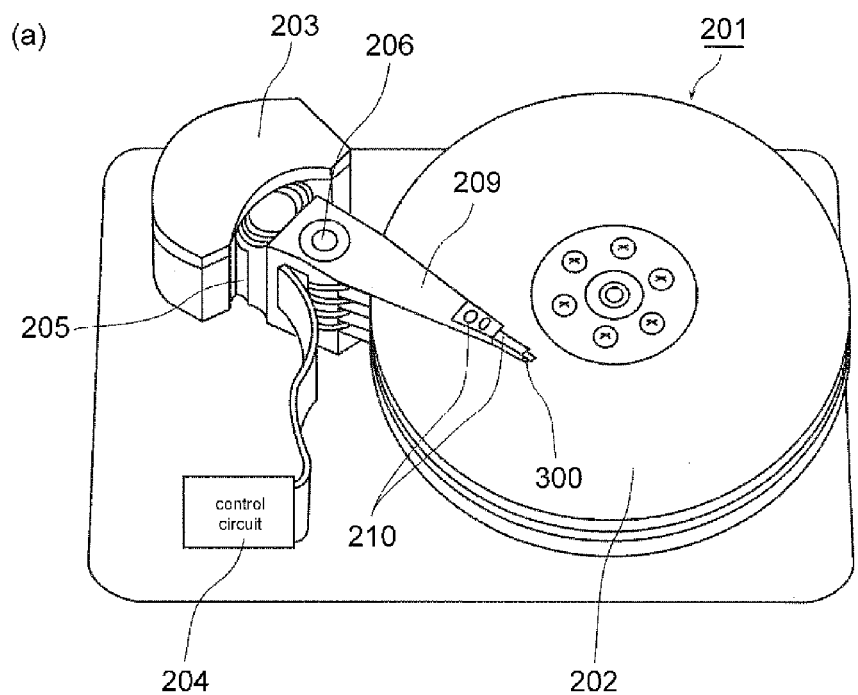
FIG. 30 (a) is a perspective view illustrating a hard disk drive equipped with a thin-film magnetic head according to an embodiment of the present invention, FIG. 30 (b) is a perspective view illustrating a rear side of HGA.
Figure 30:
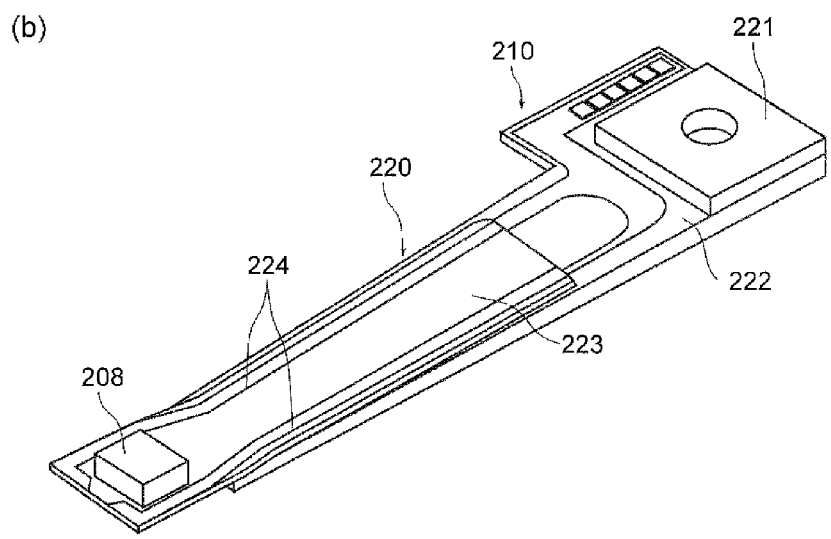
Figure 31:
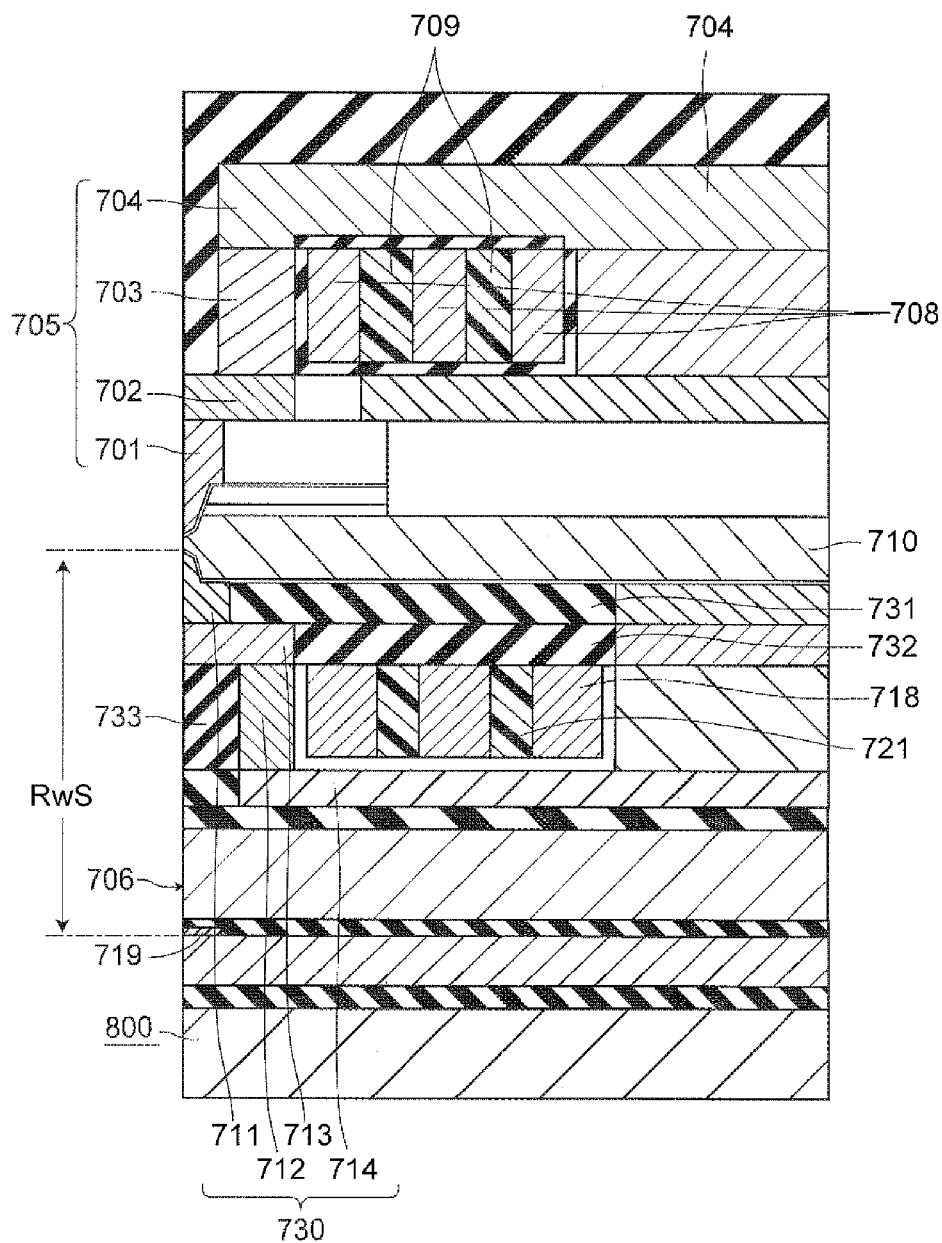
FIG. 31 is a sectional view illustrating an example of a conventional thin-film magnetic head.

FIG. 30(a) is a perspective view illustrating a hard disk drive 201 equipped with the above-mentioned thin-film magnetic head 300. FIG. 30(b) is a perspective view illustrating a rear side of HGA 210. As illustrated in FIG. 30, the hard disk drive 201 includes a hard disk (magnetic recording medium) 202 rotating at a high speed and a head gimbal assembly (HGA) 210. The hard disk drive 201 is an apparatus which actuates the HGA 210, so as to record/reproduce data onto/from recording surfaces of the hard disk 202. The hard disk 202 has a plurality of (4 in the drawing) platters. Each platter has a recording surface opposing its corresponding thin-film magnetic head 300.

The hard disk drive 201 positions a slider 208 illustrated in FIG. 30 on a track by an assembly carriage device 203. The thin-film magnetic head 300 is formed on this slider 208. Further, the hard disk drive 201 has a plurality of drive arms 209. The drive arms pivot about a pivot bearing shaft 206 by means of a voice coil motor (VCM) 205, and are stacked in a direction along the pivot bearing shaft 206. Further, an HGA 210 is attached to the tip of each drive arm.

Further, the hard disk drive 201 has a control circuit 204 controlling recording/reproducing.

The HGA 210 will now be described with reference to FIG. 30(b). In the HGA 210, the slider 208 is fixed to a tip portion of a suspension 220. Further, in the HGA 210, one end portion of a wiring member 224 is electrically connected to a terminal electrode of the slider 208.

The suspension 220 has a load beam 222, a base plate 221 provided at a base portion of the load beam 222, a flexure 223 fixed to and supported on the load beam 222 from the tip end side to the front side of the base plate 221 and having elasticity, and the wiring member 224. The wiring member 224 has a lead conductor and connection pads electrically connected to both ends of the lead conductor.

In the hard disk drive 201, when the HGA 210 is rotated, the slider 208 moves in a radial direction of the hard disk 202, i.e., a direction traversing track lines.

Such HGA 210 and hard disk drive 201 have the thin-film magnetic head 300, therefore it is possible to reduce ATE, WATE while complying with the restriction of the RWS, and to simplify the manufacturing steps so as to increase the number of HGA 210 and hard disk drive 201 manufactured in a unit time.

The thin-film coil is wound as a flat spiral about the shield magnetic layer 40, the write shield layer 60, but the thin-film coil may be wound helically about the main magnetic pole layer 26.

This invention is not limited to the foregoing embodiments but various changes and modifications of its components may be made without departing from the scope of the present invention. Besides, it is clear that various embodiments and modified examples of the present invention can be carried out on the basis of the foregoing explanation. Therefore, the present invention can be carried out in modes other than the above-mentioned best modes within the scope equivalent to the following claims.

What is claimed is:

1. A thin-film magnetic head constructed such that a main magnetic pole layer having a magnetic pole end face on a side of a medium-opposing surface opposing a recording medium, a write shield layer having a write shield end face disposed in the medium-opposing surface, a gap layer formed between the main magnetic pole layer and write shield layer, and a thin-film coil wound around any of the main magnetic pole layer, the write shield layer or a shield magnetic layer connected the main magnetic pole layer are laminated on a substrate:

wherein the thin-film coil comprises a substrate side coil layer disposed between the main magnetic pole layer and the substrate, wherein the shield magnetic layer comprising:

a leading shield part having a leading front end face disposed in the medium-opposing surface, and opposing the main magnetic pole layer through a nonmagnetic thin-film on the substrate side of the main magnetic pole layer; and a substrate side shield part having a shield upper end face in direct contact with a leading lower end face disposed at a position closest to the substrate in the leading shield part, and a shield front end face disposed in the medium-opposing surface, wherein spaces to the substrate about the leading lower end face of the leading shield part, the shield upper end face of the substrate side shield part, and a coil upper end face disposed at a position most distanced from the substrate in the substrate side coil layer are formed to be equal to each other, wherein the leading shield part has a tilted rear end face tilted to come closer to the medium-opposing surface toward the main magnetic pole layer, and wherein a depth of the leading shield part along an intersecting direction intersecting the medium-opposing surface like perpendicular is formed to be smaller than a depth of the substrate side shield part along the intersecting direction.

2. The thin-film magnetic head according to claim 1, further comprising:

a middle insulating layer in direct contact with the tilted rear end face of the leading shield part and with the shield upper end face of the substrate side shield part.

3. The thin-film magnetic head according to claim 2,
wherein the middle insulating layer has a wrap-around structure wrapping around more to the medium-opposing surface side along the tilted rear end face than is a rising rear end face along the medium-opposing surface in the leading shield part.

4. The thin-film magnetic head according to claim 1,
wherein the main magnetic pole layer has a lower tilted surface on the substrate side, the lower tilted surface is formed in a descending slope like shape closer to the substrate as the lower tilted surface is distanced more from the medium-opposing surface, and
wherein a depth of the leading shield part along the intersecting direction is formed to be smaller than a depth of the lower tilted surface along the intersecting direction.

5. The thin-film magnetic head according to claim 1,
wherein the leading shield part has a tilted upper end face having a depth along the intersecting direction smaller than a depth of the leading lower end face, and the tilted upper end face is in contact with the main magnetic pole layer through the nonmagnetic thin-film.

6. The thin-film magnetic head according to claim 1, further comprising:
a linking shield part in direct contact with a shield lower end face disposed at a position closest to the substrate in the substrate side shield part, and disposed at a position distanced from the medium-opposing surface; and
an opposing insulating layer disposed on the medium-opposing surface side of the linking shield part,
wherein a linking shield front end face disposed at a position closest to the medium-opposing surface in the linking shield part is in direct contact with the opposing insulating layer.

7. The thin-film magnetic head according to claim 6,
wherein the substrate side shield part is in direct contact with upper end faces disposed at positions most distanced from the substrate in both the opposing insulating layer and the linking shield part.

8. The thin-film magnetic head according to claim 1, further comprising:
a coil insulating layer in direct contact with the shield upper end face of the substrate side shield part and the coil upper end face of the substrate side coil layer,
wherein the leading shield part is in contact with a part, which the coil insulating layer does not touch, of the shield upper end face in the substrate side shield part.

9. The thin-film magnetic head according to claim 1,
wherein the substrate side shield part is in contact with a closest coil part disposed at a position closest to the medium-opposing surface in the substrate side coil layer through an intervening insulating layer.

10. The thin-film magnetic head according to claim 2, further comprising:
a coil insulating layer in contact with the shield upper end face of the substrate side shield part and the coil upper end face of the substrate side coil layer,
wherein the leading shield part is in contact with a part, which the coil insulating layer does not touch, of the shield upper end face in the substrate side shield part, and
wherein the middle insulating layer is in direct contact with the coil insulating layer.

11. A method of manufacturing a thin-film magnetic head constructed such that a main magnetic pole layer having a magnetic pole end face on a side of a medium-opposing surface opposing a recording medium, a write shield layer having a write shield end face disposed in the medium-opposing surface, a gap layer formed between the main magnetic pole layer and write shield layer, and a thin-film coil wound around any of the main magnetic pole layer, the write shield layer or a shield magnetic layer connected the main magnetic pole layer are laminated on a substrate;
the method comprising:
a first magnetic layer forming step of forming a substrate side shield part to be arranged in the medium-opposing surface, and a first rear shield part to be arranged at a position distanced from the substrate side shield part along an intersecting direction intersecting the medium-opposing surface like perpendicular;
a conductor layer forming step of forming a conductor layer, between the substrate side shield part and the first rear shield part, for forming a substrate side coil layer, disposed between the main magnetic pole layer and the substrate, in coil layers constituting the thin-film coil;
a first common flat surface forming step of forming a first common flat surface including a coil upper end face to be disposed at a position most distanced from the substrate in the conductor layer, by planarization processing on the surface of the conductor layer;
a second magnetic layer forming step of forming, directly on the first common flat surface, a leading magnetic layer and a second rear shield part in direct contact with the first rear shield part, the leading magnetic layer being a magnetic layer for forming a leading shield part having a leading front end face disposed in the medium-opposing surface and opposing the main magnetic pole layer through a nonmagnetic thin-film on the substrate side of the main magnetic pole layer, and having a depth along the intersecting direction smaller than a depth of the substrate side shield part,
a rear end face forming step of removing a part of a rear end face in the leading magnetic layer separated from the medium-opposing surface to form, in the leading magnetic layer, a rising rear end face along the medium-opposing surface and a tilted rear end face tilted to come closer to the medium-opposing surface than is the rising rear end face;
a second common flat surface forming step of forming a second common flat surface by performing planarization processing on the surface of the multilayer body after forming an insulating layer on a surface of the multilayer body;
a leading shield part forming step of etching the second common flat surface according to a form of the main magnetic pole layer to make the leading magnetic layer into the leading shield part; and
a main magnetic pole layer forming step of forming the main magnetic pole layer after forming a nonmagnetic thin-film on the surface of the leading shield part.

12. The method of manufacturing a thin-film magnetic head according to claim 11,
wherein in the leading shield part forming step, etching is performed on the second common flat surface to form a middle insulating layer wrapping around more to the medium-opposing surface side than is the rising rear end face.

13. The method of manufacturing a thin-film magnetic head according to claim 11, further comprising:
a linking shield part forming step of forming a linking shield part to be disposed at a position distanced from the medium-opposing surface, on the side closer to the substrate than the substrate side shield part, wherein the first magnetic layer forming step is performed such that the substrate side shield part and the first rear shield part are directly connected to the linking shield part.

14. The method of manufacturing a thin-film magnetic head according to claim 11,
wherein the leading shield part forming step is performed such that etching is performed on the second common flat surface to obtain a descending slope in which a height in a direction along the medium-opposing surface decreases as a position on the descending slope is distanced more from the medium-opposing surface.

15. The method of manufacturing a thin-film magnetic head according to claim 11,
a coil insulating layer forming step is performed after the first common flat surface forming step is performed, a coil insulating layer, in contact with a shield upper end face in direct contact with the leading shield part in the substrate side shield part and with a coil upper end face to be disposed at a position most distanced from the substrate in the substrate side coil layer, is formed in the coil insulating layer forming step.

16. The method of manufacturing a thin-film magnetic head according to claim 15,
wherein the second magnetic layer forming step is performed, after the coil insulating layer forming step is performed.

17. A head gimbal assembly comprising a thin-film magnetic head formed on a support and a gimbal for securing the support;
wherein the thin-film magnetic head is constructed such that a main magnetic pole layer having a magnetic pole end face on a side of a medium-opposing surface opposing a recording medium, a write shield layer having a write shield end face disposed in the medium-opposing surface, a gap layer formed between the main magnetic pole layer and write shield layer, and a thin-film coil wound around any of the main magnetic pole layer, the write shield layer or a shield magnetic layer connected the main magnetic pole layer are laminated on a substrate:
wherein the thin-film coil comprises a substrate side coil layer disposed between the main magnetic pole layer and the substrate,
wherein the shield magnetic layer comprising:
a leading shield part having a leading front end face disposed in the medium-opposing surface, and opposing the main magnetic pole layer through a nonmagnetic thin-film on the substrate side of the main magnetic pole layer; and
a substrate side shield part having a shield upper end face in direct contact with a leading lower end face disposed at a position closest to the substrate in the leading shield part, and a shield front end face disposed in the medium-opposing surface,
wherein spaces to the substrate about the leading lower end face of the leading shield part, the shield upper end face of the substrate side shield part, and a coil upper end face disposed at a position most distanced from the substrate in the substrate side coil layer are formed to be equal to each other,
wherein the leading shield part has a tilted rear end face tilted to come closer to the medium-opposing surface toward the main magnetic pole layer, and
wherein a depth of the leading shield part along an intersecting direction intersecting the medium-opposing surface like perpendicular is formed to be smaller than a depth of the substrate side shield part along the intersecting direction.

18. A hard disk drive comprising a head gimbal assembly having a thin-film magnetic head and a recording medium opposing the thin-film magnetic head;
wherein the thin-film magnetic head is constructed such that a main magnetic pole layer having a magnetic pole end face on a side of a medium-opposing surface opposing a recording medium, a write shield layer having a write shield end face disposed in the medium-opposing surface, a gap layer formed between the main magnetic pole layer and write shield layer, and a thin-film coil wound around any of the main magnetic pole layer, the write shield layer or a shield magnetic layer connected the main magnetic pole layer are laminated on a substrate:
wherein the thin-film coil comprises a substrate side coil layer disposed between the main magnetic pole layer and the substrate,
wherein the shield magnetic layer comprising:
a leading shield part having a leading front end face disposed in the medium-opposing surface, and opposing the main magnetic pole layer through a nonmagnetic thin-film on the substrate side of the main magnetic pole layer; and
a substrate side shield part having a shield upper end face in direct contact with a leading lower end face disposed at a position closest to the substrate in the leading shield part, and a shield front end face disposed in the medium-opposing surface,
wherein spaces to the substrate about the leading lower end face of the leading shield part, the shield upper end face of the substrate side shield part, and a coil upper end face disposed at a position most distanced from the substrate in the substrate side coil layer are formed to be equal to each other,
wherein the leading shield part has a tilted rear end face tilted to come closer to the medium-opposing surface toward the main magnetic pole layer, and
wherein a depth of the leading shield part along an intersecting direction intersecting the medium-opposing surface like perpendicular is formed to be smaller than a depth of the substrate side shield part along the intersecting direction.

* * * * *